(12) United States Patent
Yasui et al.

(10) Patent No.: US 6,681,567 B2
(45) Date of Patent: Jan. 27, 2004

(54) CONTROL SYSTEM FOR INTERNAL COMBUSTION ENGINE

(75) Inventors: Yuji Yasui, Wako (JP); Masaki Ueno, Wako (JP); Shusuke Akazaki, Wako (JP); Yoshihisa Iwaki, Wako (JP); Masahiro Sato, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/996,719

(22) Filed: Nov. 30, 2001

(65) Prior Publication Data
US 2002/0092293 A1 Jul. 18, 2002

(30) Foreign Application Priority Data
Dec. 1, 2000 (JP) .................................. 2000-366487

(51) Int. Cl.[7] .................................. F01N 3/00
(52) U.S. Cl. .................. 60/297; 60/274; 60/278; 60/285; 60/284
(58) Field of Search .................. 60/284, 297, 300, 60/278, 285, 274

(56) References Cited

U.S. PATENT DOCUMENTS

| | | | | |
|---|---|---|---|---|
| 5,482,020 A | * | 1/1996 | Shimizu et al. | 123/406.47 |
| 5,664,544 A | * | 9/1997 | Tomisawa | 123/406.42 |
| 5,911,681 A | * | 6/1999 | Tanaka et al. | 60/274 |
| 5,946,906 A | * | 9/1999 | Akazaki et al. | 60/278 |
| 6,041,755 A | * | 3/2000 | Mashiki | 123/295 |
| 6,116,213 A | * | 9/2000 | Yasui et al. | 123/339.11 |
| 6,170,260 B1 | * | 1/2001 | Ishii et al. | 123/406.42 |
| 6,212,881 B1 | * | 4/2001 | Takahashi et al. | 123/568.15 |
| 6,276,131 B1 | * | 8/2001 | Ueno et al. | 123/339.11 |
| 6,354,076 B1 | * | 3/2002 | Yasui et al. | 123/339.11 |
| 6,354,269 B1 | * | 3/2002 | Saito et al. | 123/406.42 |

FOREIGN PATENT DOCUMENTS

JP         10-153112        6/1998

* cited by examiner

*Primary Examiner*—Thomas Denion
*Assistant Examiner*—Diem Tran
(74) *Attorney, Agent, or Firm*—Arent Fox Kintner Plotkin & Kahn, PLLC

(57) ABSTRACT

A control system for an internal combustion engine having an exhaust system, an intake system, and an exhaust gas recirculation mechanism for recirculating exhaust gases from the exhaust system to the intake system is disclosed. The exhaust system is provided with an adsorbent for adsorbing hydrocarbon. When the adsorbent has adsorbed the hydrocarbon and the engine is operating in an idling condition, an intake air amount of the engine is increased and an ignition timing of said engine is retarded, and at the same time, the exhaust gas recirculation is performed to recirculate the hydrocarbon desorbed from the adsorbent to the intake system.

51 Claims, 20 Drawing Sheets

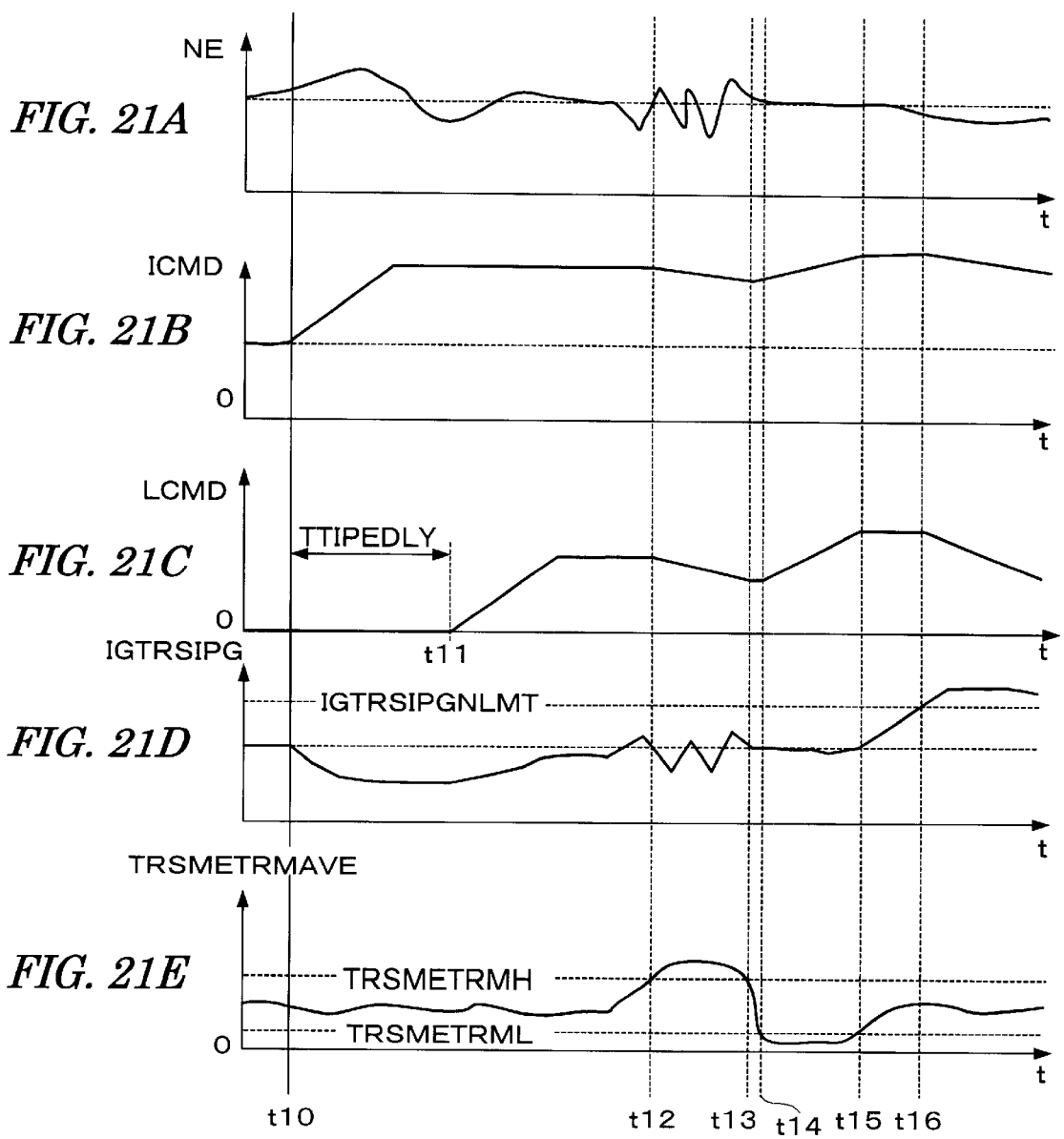

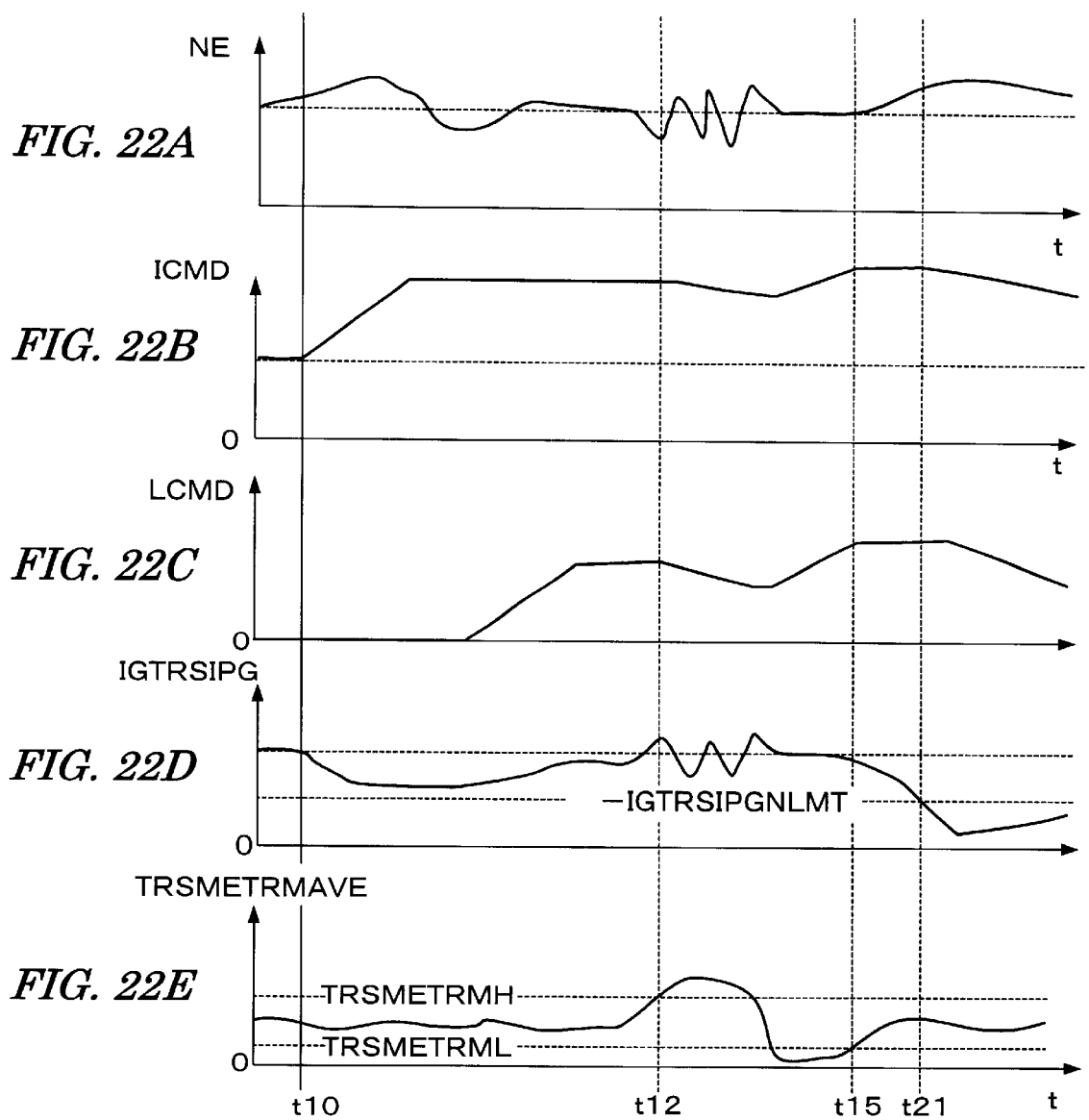

CONTROL SYSTEM FOR INTERNAL COMBUSTION ENGINE

BACKGROUND OF THE INVENTION

1. Field of the Invention

The present invention relates to a control system for an internal combustion engine having an exhaust system provided with an HC adsorbent for adsorbing hydrocarbon, and more particularly to a control system for controlling an intake air amount, ignition timing, and/or exhaust gas recirculation amount.

2. Description of the Related Art

In an internal combustion engine having an exhaust system provided with a three-way catalyst and an HC adsorbent for adsorbing hydrocarbon (HC) contained in exhaust gases at cold starting of the engine, it is known that the HC is adsorbed by the HC adsorbent until the three-way catalyst is activated, thereby reducing the amount of HC emitted at cold starting of the engine. When the temperature of the HC adsorbent becomes high, the HC adsorbed by the HC adsorbent is desorbed. Accordingly, in the case that the HC adsorbent is provided downstream of the three-way catalyst, there is a problem of how to process the HC desorbed from the HC adsorbent. As a technique for dealing with this problem, it is known that the HC desorbed from the HC adsorbent is recirculated to an intake system of the engine (Japanese Patent Laid-open No. 10-153112).

However, the exhaust gas recirculation is not performed during a low-load operation of the engine, including an idling operation. Accordingly, in the case that the engine is started and only the idling operation or very-low-speed running of the vehicle driven by the engine is subsequently performed until the engine is stopped, the exhaust gas recirculation is not performed. As a result, the HC adsorbed by the HC adsorbent is not completely desorbed, and newly introduced HC cannot be sufficiently adsorbed by the HC adsorbent at the next starting of the engine.

SUMMARY OF THE INVENTION

It is accordingly an object of the present invention to provide a control system for an internal combustion engine which can reliably discharge HC adsorbed by an HC adsorbent to maintain exhaust emission characteristics at starting of the engine in a good condition.

The present invention provides a control system for an internal combustion engine having an exhaust system provided with an adsorbent for adsorbing hydrocarbon. The control system includes adsorbent temperature raising means for increasing an intake air amount of the engine and retarding an ignition timing of the engine when the adsorbent has adsorbed the hydrocarbon and the engine is operating in an idling condition.

With this configuration, when the adsorbent has adsorbed the hydrocarbon and the engine is operating in an idling condition, the intake air amount of the engine is increased and the ignition timing of the engine is retarded. Accordingly, the rise in the exhaust gas temperature can be accelerated to thereby accelerate the rise in temperature of the adsorbent. As a result, the time period required for completion of the desorption of the hydrocarbon adsorbed by the adsorbent can be shortened, and it is therefore possible to reduce the number of cases in which the engine is stopped in the condition where the desorption is incomplete, thereby enhancing the exhaust gas purification effect by the adsorbent.

Preferably, the adsorbent temperature raising means gradually increases the intake air amount and gradually retard the ignition timing.

With this configuration, the intake air amount is gradually increased and the ignition timing is gradually retarded. Accordingly, stable combustion can be continued even under the conditions where the combustion is prone to become unstable, such as immediately after starting of the engine at a low ambient temperature or at a low atmospheric pressure.

Preferably, the adsorbent temperature raising means retards the ignition timing so as to maintain a rotational speed of the engine at a target rotational speed.

With this configuration, the ignition timing is retarded so that the engine rotational speed is maintained at the target rotational speed. Accordingly, the ignition timing can be automatically set to an optimum ignition timing which changes according to an ambient temperature, atmospheric pressure, or engine operating conditions.

Preferably, the exhaust system includes a catalyst for exhaust gas purification, and the hydrocarbon desorbed from the adsorbent is recirculated to a portion upstream of the catalyst.

With this configuration, the hydrocarbon desorbed from the adsorbent is recirculated to the upstream side of the catalyst, so that the hydrocarbon adsorbed by the adsorbent can be reliably purified (oxidized).

Preferably, the adsorbent temperature raising means decreases the intake air amount when the ignition timing is retarded beyond a predetermined retard limit value.

With this configuration, when the ignition timing is retarded beyond the predetermined retard limit value, the intake air amount is decreased. Accordingly, it is possible to prevent an increase in engine rotation fluctuation and a deterioration of the engine combustion due to an excessive retard of the ignition timing.

The present invention further provides a control system for an internal combustion engine having an exhaust system, an intake system, and an exhaust gas recirculation mechanism for recirculating exhaust gases from the exhaust system to the intake system. The exhaust system is provided with an adsorbent for adsorbing hydrocarbon. The control system includes recirculation control means for performing recirculation of the exhaust gases through the exhaust gas recirculation mechanism to recirculate the hydrocarbon desorbed from the adsorbent to the intake system when the adsorbent has adsorbed the hydrocarbon and the engine is operating in an idling condition.

With this configuration, when the adsorbent has adsorbed the hydrocarbon and the engine is operating in an idling condition, the exhaust gas recirculation is performed to recirculate the hydrocarbon desorbed from the adsorbent to the intake system. Accordingly, even when only the idling operation is carried out after starting of the engine until the engine is stopped, the hydrocarbon adsorbed by the adsorbent can be reliably desorbed to thereby maintain good exhaust emission characteristics immediately after starting of the engine.

Preferably, the control system further includes intake air amount increasing means for increasing an intake air amount of the engine during execution of the exhaust gas recirculation by the recirculation control means.

With this configuration, the intake air amount of the engine is increased during execution of the exhaust gas recirculation. Accordingly, it is possible to prevent instability of the combustion due to the exhaust gas recirculation during idling of the engine, to thereby maintain a stable idling operation.

Preferably, the intake air amount increasing means controls the intake air amount so that an increase in the intake air amount becomes greater than a decrease in the intake air amount due to the exhaust gas recirculation.

With this configuration, the increase in the intake air amount is controlled to become greater than the decrease in the intake air amount due to the exhaust gas recirculation. Accordingly, the thermal energy of the exhaust gases can be made larger than that in a normal idling operation, so that the temperature rise of the adsorbent is accelerated to shorten the time period required for completion of the desorption of hydrocarbon.

Preferably, the control system further includes ignition timing correcting means for correcting an ignition timing of the engine when the intake air amount is increased during execution of the exhaust gas recirculation by the recirculation control means.

With this configuration, the ignition timing is corrected when increasing the intake air amount of the engine during execution of the exhaust gas recirculation. Accordingly, by correcting the ignition timing to an optimum value, instability of the combustion can be prevented.

Preferably, the amount of the recirculated exhaust gases, the intake air amount, and the ignition timing are gradually changed.

With this configuration, stable combustion can be continued even under the conditions where the combustion is prone to become unstable, such as immediately after starting of the engine at a low ambient temperature or at a low atmospheric pressure.

Preferably, the ignition timing correcting means corrects the ignition timing so as to maintain a rotational speed of the engine at a target rotational speed.

With this configuration, the ignition timing is corrected so that the engine rotational speed is maintained at the target rotational speed. An optimum ignition timing changes with the amount of hydrocarbon mixed into the intake air, because the hydrocarbon desorbed from the adsorbent is recirculated to the intake system. However, by setting the ignition timing so as to maintain the engine rotational speed at the target speed, the ignition timing can be automatically set to an optimum ignition timing.

Preferably, the recirculation control means increases the amount of the recirculated exhaust gases with a delay or a dead time with respect to the increase of the intake air amount and the correction of the ignition timing.

With this configuration, the increase of the exhaust gas recirculation amount is performed with a delay or a dead time with respect to the increase of the intake air amount and the correction of the ignition timing. Accordingly, engine rotation fluctuation at starting of the exhaust gas recirculation can be minimized.

Preferably, the ignition timing correcting means corrects the ignition timing after the increase of the intake air amount.

With this configuration, the ignition timing is corrected after increasing the intake air amount. Accordingly, it is possible to prevent instability of the combustion when increasing the intake air amount.

Preferably, the intake air amount increasing means decreases the intake air amount when the ignition timing is retarded beyond a predetermined retard limit value.

With this configuration, when the ignition timing is retarded beyond the predetermined retard limit value, the intake air amount is decreased. Accordingly, it is possible to prevent an increase in engine rotation fluctuation and a deterioration of the engine combustion due to an excessive retard of the ignition timing.

Preferably, the control system further includes rotational speed fluctuation amount detecting means for detecting a fluctuation amount of rotational speed of the engine. The recirculation control means increases the amount of the recirculated exhaust gases when the fluctuation amount detected by the rotational speed fluctuation amount detecting means is less than a first predetermined fluctuation amount.

With this configuration, when the detected engine rotation fluctuation amount is less than the first predetermined fluctuation amount, the exhaust gas recirculation amount is corrected to increase. Accordingly, the amount of hydrocarbon desorbed from the adsorbent and recirculated to the intake system can be increased up to such a degree that the engine rotation does not become unstable, thereby shortening the time period required for completion of the desorption of hydrocarbon.

Preferably, the recirculation control means decreases the amount of the recirculated exhaust gases when the fluctuation amount detected by the rotational speed fluctuation amount detecting means is greater than a second predetermined fluctuation amount.

With this configuration, when the detected engine rotation fluctuation amount is greater than the second predetermined fluctuation amount, the exhaust gas recirculation amount is corrected to decrease. Accordingly, it is possible to prevent instability of the engine rotation due to an excessive exhaust gas recirculation.

Preferably, the recirculation control means decreases the amount of the recirculated exhaust gases when the ignition timing is advanced beyond a predetermined advance limit value.

With this configuration, when the ignition timing is advanced beyond the predetermined advance limit value, the exhaust gas recirculation amount is corrected to decrease. Accordingly, it is possible to avoid such a situation that an advance control range of the ignition timing may be reduced to cause instability of the engine rotational speed control.

BRIEF DESCRIPTION OF THE DRAWINGS

FIGS. 21A to 21E are time charts for illustrating the control operation in the preferred embodiment; and FIGS. 22A to 22E are time charts for illustrating the control operation in the preferred embodiment.

DETAILED DESCRIPTION OF THE PREFERRED EMBODIMENTS

A preferred embodiment of the present invention will now be described with reference to the drawings.

Figure 1:
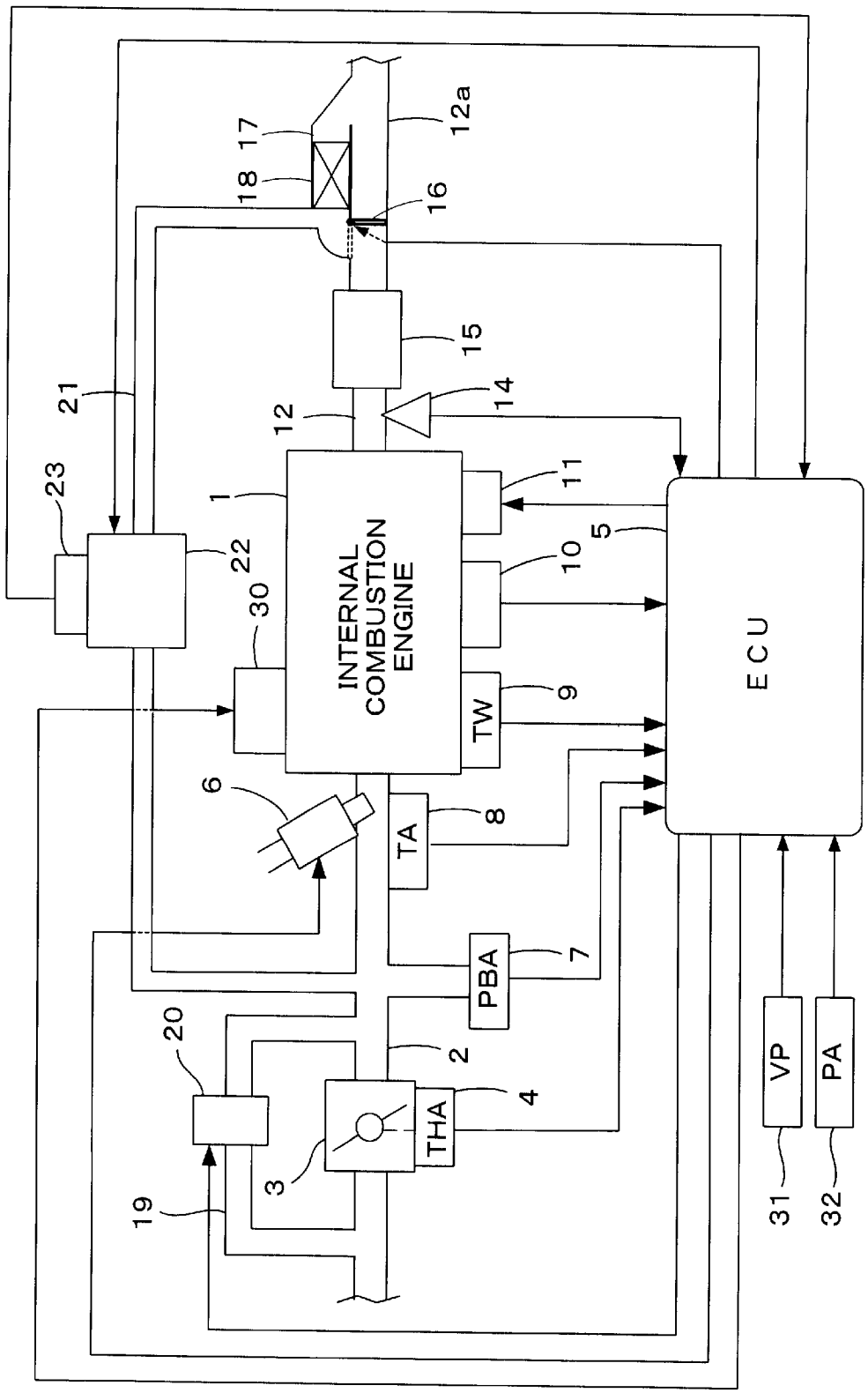
FIG. 1 is a schematic diagram showing the configuration of an internal combustion engine and a control system therefor according to a preferred embodiment of the present invention.

Referring to FIG. 1, there is schematically shown a general configuration of an internal combustion engine (which will be hereinafter referred to as "engine") and a control system therefor according to a preferred embodiment of the present invention. The engine illustrated represents a four-cylinder engine 1, for example, and it has an intake pipe 2 provided with a throttle valve 3. A throttle opening (THA) sensor 4 is connected to the throttle valve 3, so as to output an electrical signal corresponding to an opening angle of the throttle valve 3 and supply the electrical signal to an electronic control unit (which will be hereinafter referred to as "ECU") 5.

A bypass passage 19 bypassing the throttle valve 3 is connected to the intake pipe 2. The bypass passage 19 is provided with an idle control valve 20 for controlling a bypass air amount. The idle control valve 20 is connected to the ECU 5, and its valve opening amount is controlled by the ECU 5.

Fuel injection valves 6, only one of which is shown, may be inserted into the intake pipe 2 at locations intermediate between the cylinder block of the engine 1 and the throttle valve 3 and slightly upstream of the respective intake valves (not shown). The fuel injection valves 6 are connected to a fuel pump (not shown), and electrically connected to the ECU 5. A valve opening period of each fuel injection valve 6 is controlled by a signal output from the ECU 5.

An absolute intake pressure (PBA) sensor 7 may be provided immediately downstream of the throttle valve 3. An absolute pressure signal converted to an electrical signal by the absolute intake pressure sensor 7 is supplied to the ECU 5. An intake air temperature (TA) sensor 8 may be provided downstream of the absolute intake pressure sensor 7 to detect an intake air temperature TA. An electrical signal corresponding to the detected intake air temperature TA is output from the sensor 8 and supplied to the ECU 5.

An engine coolant temperature (TW) sensor 9 such as a thermistor may be mounted on the body of the engine 1 to detect an engine coolant temperature (cooling water temperature) TW. A temperature signal corresponding to the detected engine coolant temperature TW is output from the sensor 9 and supplied to the ECU 5.

A crank angle position sensor 10 for detecting a rotational angle of a crankshaft (not shown) of the engine 1 is connected to the ECU 5, and a signal corresponding to the detected rotational angle of the crankshaft is supplied to the ECU 5. The crank angle position sensor 10 consists of a cylinder discrimination sensor for outputting a signal pulse at a predetermined crank angle position for a specific cylinder of the engine 1 (this signal pulse will be hereinafter referred to as "CYL signal pulse"). The crank angle position sensor 10 also consists of a TDC sensor for outputting a TDC signal pulse at a crank angle position before a top dead center (TDC) of a predetermined crank angle starting at an intake stroke in each cylinder (at every 180 deg crank angle in the case of a four-cylinder engine), and a CRK sensor for generating one pulse with a constant crank angle period (e.g., a period of 30 deg) shorter than the period of generation of the TDC signal pulse (this pulse will be hereinafter referred to as "CRK signal pulse"). The CYL signal pulse, the TDC signal pulse, and the CRK signal pulse are supplied to the ECU 5. These signal pulses are used to control the various timings, such as fuel injection timing and ignition timing, and for detection of an engine rotational speed NE.

An exhaust pipe 12 of the engine 1 is provided with a three-way catalyst 15 for reducing HC, CO, and NOx. A proportional type air-fuel ratio sensor (which will be hereinafter referred to as "LAF sensor") 14 is mounted on the exhaust pipe 12 at a position upstream of the three-way catalyst 15. The LAF sensor 14 outputs an electrical signal substantially proportional to the oxygen concentration (air-fuel ratio) in the exhaust gases, and supplies the electrical signal to the ECU 5.

A switching valve 16 and a branch passage 17 are provided downstream of the three-way catalyst 15. An HC adsorbent 18 for adsorbing HC is installed in the branch passage 17. The switching valve 16 is connected to the ECU 5, and its operation is controlled by the ECU 5. At cold starting of the engine 1, the switching valve 16 is controlled to a starting position shown by a solid line in FIG. 1 where the exhaust gases are entirely introduced into the branch passage 17. After completion of activation of the three-way catalyst 15, the switching valve 16 is controlled to a normal position shown by a broken line in FIG. 1 where the exhaust gases are introduced into a main exhaust passage 12a.

An exhaust gas recirculation passage 21 is connected between a portion of the intake pipe 2 downstream of the throttle valve 3 and a portion of the exhaust pipe 12 upstream of the HC adsorbent 18 in the branch passage 17. The exhaust gas recirculation passage 21 is provided with an exhaust gas recirculation valve (which will be hereinafter referred to as "EGR valve") 22 for controlling an exhaust gas recirculation amount. The EGR valve 22 is an electromagnetic valve having a solenoid, and its valve opening degree is controlled by the ECU 5. The EGR valve 22 is provided with a lift sensor 23 for detecting the valve opening degree (valve lift) LACT of the EGR valve 22, and a detection signal from the lift sensor 23 is supplied to the ECU 5. The exhaust gas recirculation passage 21 and the EGR valve 22 constitute an exhaust gas recirculation mechanism.

The HC adsorbed by the HC adsorbent 18 is returned through the passage 21 to the intake system (intake pipe 2) by performing the exhaust gas recirculation in the condition where the switching valve 16 is controlled to the normal position. Then, the HC returned to the intake system is reduced by the combustion in the engine 1 or by the activated three-way catalyst 15.

A spark plug 11 is provided in each cylinder of the engine 1. Each spark plug 11 is connected to the ECU 5, and a drive signal for each spark plug 11, i.e., an ignition signal is supplied from the ECU 5.

The engine 1 may have a valve timing switching mechanism 30 capable of switching the valve timing of intake valves and exhaust valves between a high-speed valve timing suitable for a high-speed operating region of the engine 1 and a low-speed valve timing suitable for a low-speed operating region of the engine 1. Switching the valve timing also includes switching of a valve lift amount. Further, when selecting the low-speed valve timing, one of the two intake valves in each cylinder is stopped to ensure stable combustion even in the case of setting the air-fuel ratio lean with respect to the stoichiometric ratio.

The valve timing switching mechanism 30 is of a type that the switching of the valve timing is carried out hydraulically. That is, a solenoid valve for performing the hydraulic switching and an oil pressure sensor are connected to the ECU 5. A detection signal from the oil pressure sensor is supplied to the ECU 5, and the ECU 5 controls the solenoid valve to perform the switching control of the valve timing according to an operating condition of the engine 1.

A vehicle speed sensor 31 for detecting a running speed (vehicle speed) VP of a vehicle driven by the engine 1 and an atmospheric pressure sensor 32 for detecting an atmospheric pressure PA are connected to the ECU 5. Detection signals from the vehicle speed sensor 31 and the atmospheric pressure sensor 32 are supplied to the ECU 5.

The ECU 5 includes an input circuit having various functions including a function of shaping the waveforms of input signals from the various sensors, a function of correcting the voltage levels of the input signals to a predetermined level, and a function of converting analog signal values into digital signal values, a central processing unit (which will be hereinafter referred to as "CPU"), a memory circuit preliminarily storing various operating programs to be executed by the CPU and for storing the results of computation or the like by the CPU, and an output circuit for supplying drive signals to the fuel injection valves 6 and the spark plugs 11, for example.

The CPU of the ECU 5 determines various engine operating conditions according to various engine parameter signals as mentioned above, and computes a fuel injection period TOUT of each fuel injection valve 6 to be opened in synchronism with the TDC signal pulse, in accordance with Eq. (1) according to the above determined engine operating conditions.

$$TOUT = TIM \times KCMD \times KLAF \times KEGR \times K1 + K2 \quad (1)$$

TIM is a basic fuel amount, more specifically, a basic fuel injection period of each fuel injection valve 6. The basic fuel amount TIM is determined by retrieving a TI map set according to the engine rotational speed NE and the absolute intake pressure PBA. The TI map is set so that the air-fuel ratio of an air-fuel mixture to be supplied to the engine 1 becomes substantially equal to the stoichiometric ratio in an operating condition according to the engine rotational speed NE and the absolute intake pressure PBA. That is, the basic fuel amount TIM has a value substantially proportional to an intake air amount (mass flow) per unit time by the engine.

KCMD is a target air-fuel ratio coefficient, which is set according to engine operating parameters such as the engine rotational speed NE, the throttle opening THA, and the engine coolant temperature TW. The target air-fuel ratio coefficient KCMD is proportional to the reciprocal of an air-fuel ratio A/F, i.e., proportional to a fuel-air ratio F/A, and takes a value of 1.0 for the stoichiometric ratio. Therefore, KCMD is also referred to as a target equivalent ratio.

KLAF is an air-fuel ratio correction coefficient calculated by the PID (Proportional, Integral, and Differential) control so that a detected equivalent ratio KACT calculated from a value detected by the LAF sensor 14 becomes equal to the target equivalent ratio KCMD when the execution conditions of the air-fuel ratio feedback control are satisfied.

KEGR is an EGR correction coefficient which is set to 1.0 (noncorrection value) when the exhaust gas recirculation is not carried out (when the EGR valve 22 is closed) or set to a value less than 1.0 when the exhaust gas recirculation is carried out (when the EGR valve 22 is opened) to decrease a fuel injection amount according to a decrease in the intake air amount.

K1 and K2 are another correction coefficient and a correction variable computed according to various engine parameter signals, respectively. Correction coefficient K1 and correction variable K2 may be selected to optimize various characteristics such as fuel consumption characteristics and engine acceleration characteristics according to engine operating conditions.

The CPU of the ECU 5 further calculates an ignition timing IGLOG from Eq. (2) shown below.

$$IGLOG = IGMAP + IGCR + IGTRSIPG \quad (2)$$

where IGMAP is a basic value of ignition timing, i.e., an ignition timing indicative of an advance angle with respect to a top dead center, obtained by retrieving an IG map set according to the engine rotational speed NE and the absolute intake pressure PBA. IGTRSIPG is an idle desorption mode correction term which is set so that the engine rotational speed NE coincides with a target engine rotational speed NOBJ when performing an idle desorption control for desorbing the HC adsorbed by the HC adsorbent 18 during idling of the engine 1. The idle desorption control will be hereinafter described. IGCR is another correction term which is normally applied. (IGMAP+IGCR) corresponds to an ignition timing set in a normal control where the idle desorption control is not performed. In the following description, the operating mode for performing the idle desorption control will be referred to as "idle desorption mode".

The CPU of the ECU 5 calculates a valve opening control amount ICMD for controlling the valve opening amount of the idle control valve 20 according to engine operating conditions, and supplies a drive signal corresponding to the calculated valve opening control amount ICMD to the idle control valve 20. In the idle desorption mode, the CPU of the ECU 5 calculates the valve opening control amount ICMD from Eq. (3) shown below. The intake air amount through the idle control valve 20 to the engine 1 is proportional to the valve opening control amount ICMD.

$$ICMD=(ITRSIPG+ILOAD+ITW+IXREF) \times KIPA \qquad (3)$$

In Eq. (3), ITRSIPG is an idle desorption mode control term used in the idle desorption mode. ILOAD is a load correction term set according to whether an electrical load on the engine 1, a compressor load of an air conditioner, or a power steering load are on or off, or whether or not an automatic transmission of the vehicle is in the in-gear condition. ITW is a water temperature correction term set according to the engine coolant temperature TW. IXREF is a learning term of the valve opening control amount ICMD. KIPA is an atmospheric pressure correction coefficient set according to the atmospheric pressure PA.

The CPU of the ECU 5 further calculates a lift command value LCMD for the EGR valve 22 according to engine operating conditions.

The ECU 5 outputs a drive signal for opening each fuel injection valve 6 according to the fuel injection period TOUT obtained above, an ignition signal for driving each spark plug 11 according to the ignition timing IGLOG obtained above, a drive signal for the idle control valve 20 according to the valve opening control amount ICMD obtained above, and a drive signal for the EGR valve 22 according to the lift command value LCMD obtained above.

Figure 2:
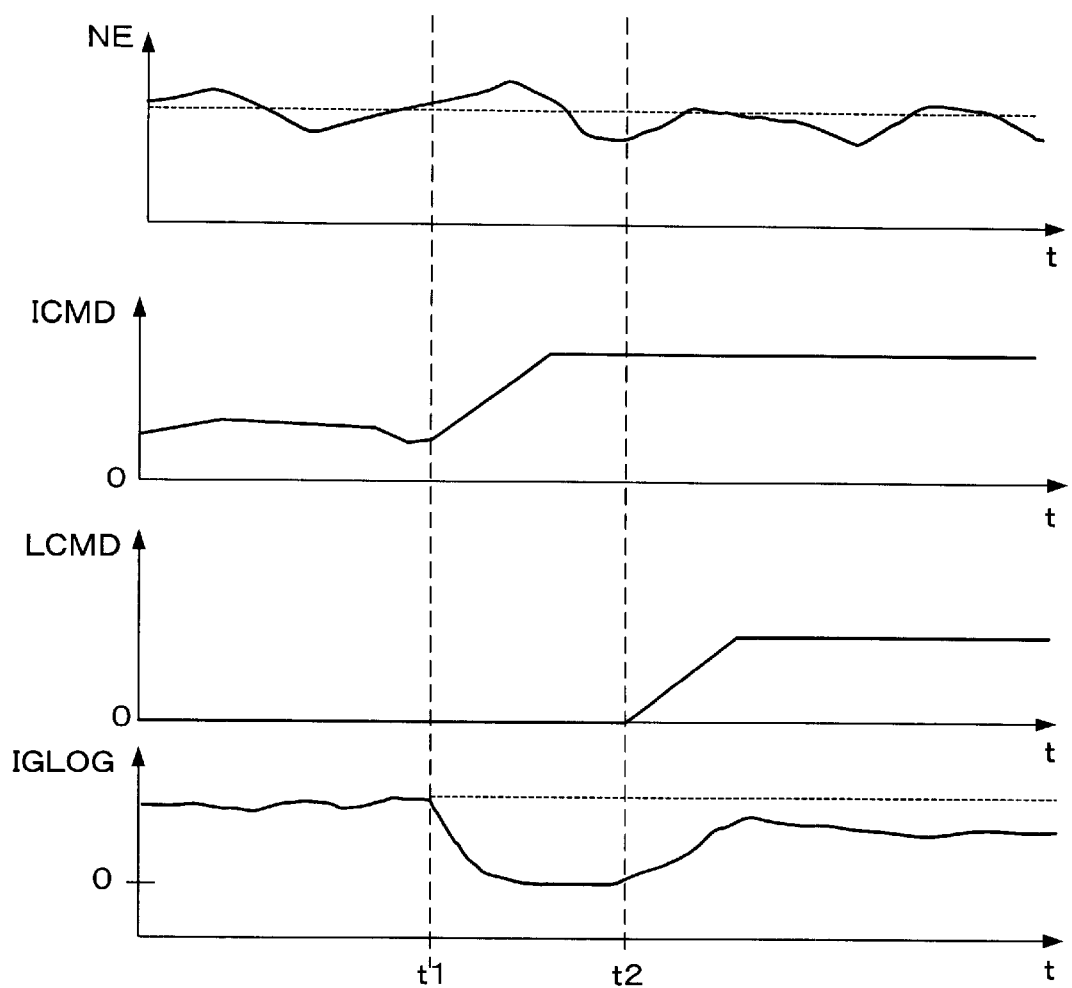
FIG. 2 is a time chart for illustrating the outline of the control in the preferred embodiment.

FIG. 2 is a time chart for illustrating the outline of the control of the valve opening control amount ICMD for the idle control valve 20, the lift command value LCMD for the EGR valve 22, and the ignition timing IGLOG in the idle desorption mode.

During idling after starting the engine, the valve opening control amount ICMD for the idle control valve 20 is increased from time t1 at which the activation of the three-way catalyst 15 has been completed. Further, feedback control of the ignition timing IGLOG is started at time t1 to maintain the engine rotational speed NE at the target speed NOBJ. The ignition timing IGLOG is corrected in the retarding direction so that the engine rotational speed NE is not increased with an increase in the intake air amount (with a slight delay from the increase in the intake air amount). By this control, the temperature rise of the HC adsorbent 18 is accelerated, so that the temperature of the HC adsorbent 18 early reaches a temperature at which the HC adsorbed by the HC adsorbent 18 can be desorbed. That is, the time period required for completion of the desorption of HC can be shortened.

Thereafter, the exhaust gas recirculation is started at time t2 to return the desorbed HC to the intake system. Thus, by performing the exhaust gas recirculation during idling, the HC adsorbed by the HC adsorbent 18 at starting of the engine 1 can be desorbed and returned to the intake system. Accordingly, even when the engine is stopped after performing only an idling operation or a low-load operation, the HC adsorbent 18 can be restored to a condition where it can reliably adsorb HC for the next starting of the engine. As a result, an effect of improving exhaust gas characteristics by the HC adsorbent can be obtained to the maximum.

Figure 3A:
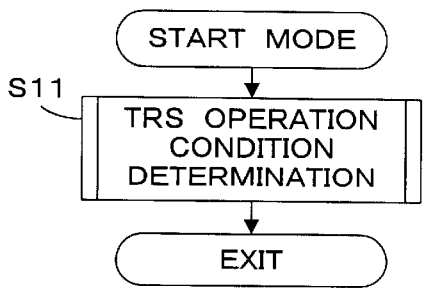
FIGS. 3A to 3E are flowcharts showing a general configuration of control processing in the preferred embodiment.

FIGS. 3A to 3E are exemplary flowcharts showing a general configuration of an exemplary control process to be executed by the CPU of the ECU 5 when performing the adsorption of HC to the HC adsorbent 18 and the desorption of HC from the HC adsorbent 18. FIG. 3A shows an exemplary process to be executed at starting the engine 1. In step S11, TRS operation condition determination process (an example of which is shown in FIG. 4) is executed. In the process of step S11, it is determined whether or not a TRS operation condition for operating a Trap & Recirculation System (TRS) is satisfied. The Trap & Recirculation System consists of the switching valve 16, the branch passage 17, the HC adsorbent 18, and the exhaust gas recirculation mechanism. If the TRS operation condition is satisfied, a TRS operation flag FTRSRUN is set to "1".

Figure 3B:
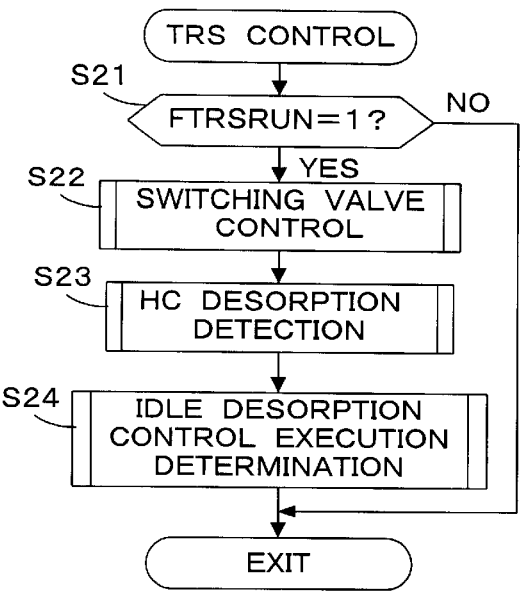
Figure 4:
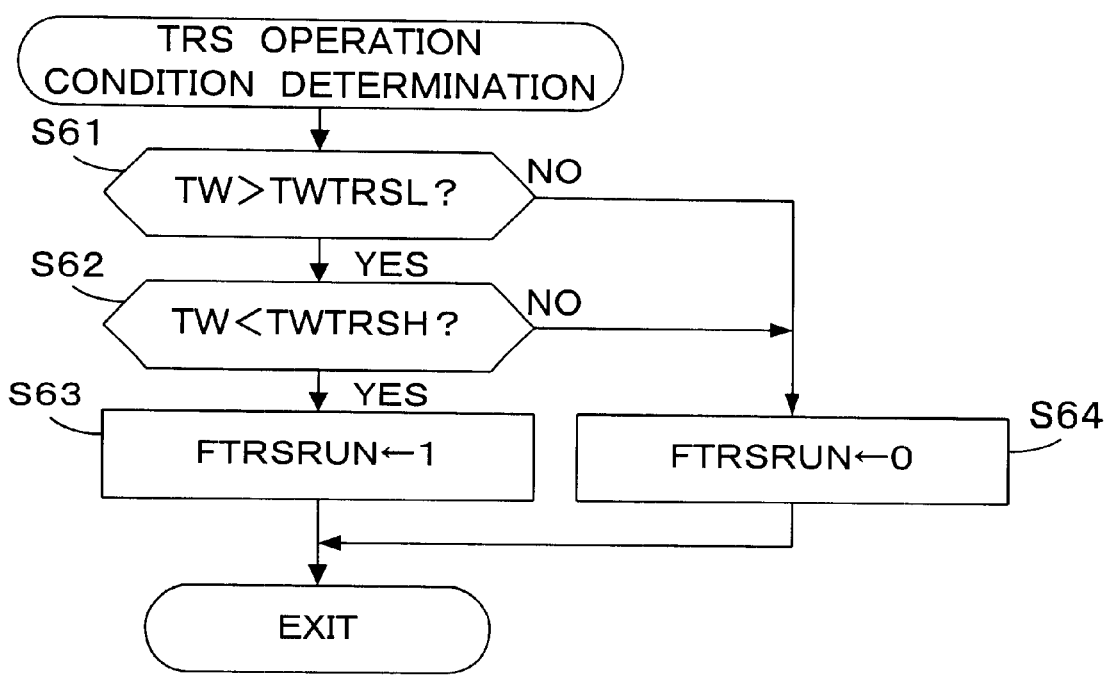
FIG. 4 is a flowchart showing a program for determining the condition for operation of a HC trap and recirculation system.

FIG. 3B is an exemplary flowchart showing an exemplary TRS control process to be executed when the TRS operation condition is satisfied. This process may be executed by the CPU of the ECU 5 at predetermined time periods (e.g., 100 msec).

In step S21, it is determined whether or not the TRS operation flag FTRSRUN is "1". If FTRSRUN is "0", the process ends. If FTRSRUN is "1", the CPU executes a switching valve control process (see FIG. 5) for controlling the switching valve 16 (step S22), an HC desorption detection process (see FIG. 6) for determining whether or not the desorption of HC from the HC adsorbent 18 has been completed (step S23), and an idle desorption control execution determination process (for example, see FIG. 8) for determining whether or not the idle desorption control is to be performed (step S24).

Figure 3C:
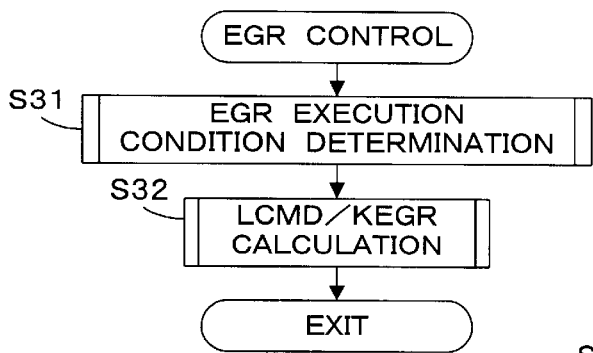

FIG. 3C is an examplary flowchart of an EGR control process for controlling the lift amount of the EGR valve 22. This process may be executed by the CPU of the ECU 5 in synchronism with the generation of a TDC signal pulse.

Figure 9:
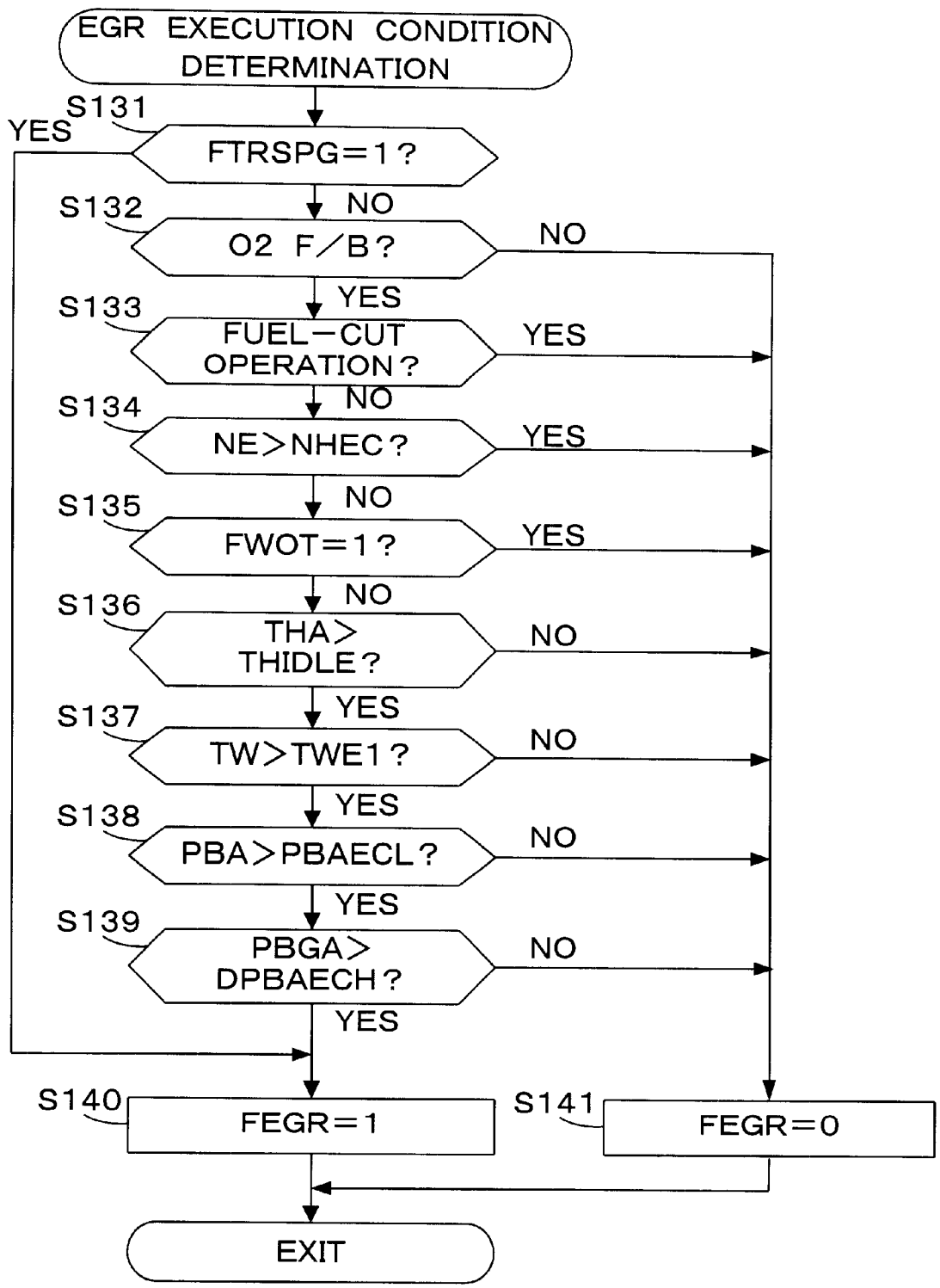
FIG. 9 is a flowchart showing a program for determining the engine operational region for execution of exhaust gas recirculation.

In step S31, an EGR execution region determination process (an example is shown in FIG. 9) is executed. In this process, an EGR execution region where the exhaust gas recirculation is performed is determined. Next, an LCMD/KEGR calculation process (for example, see FIG. 10) for calculating the lift command value LCMD of the EGR valve 22 and the EGR correction coefficient KEGR is executed (step S32).

Figure 3D:
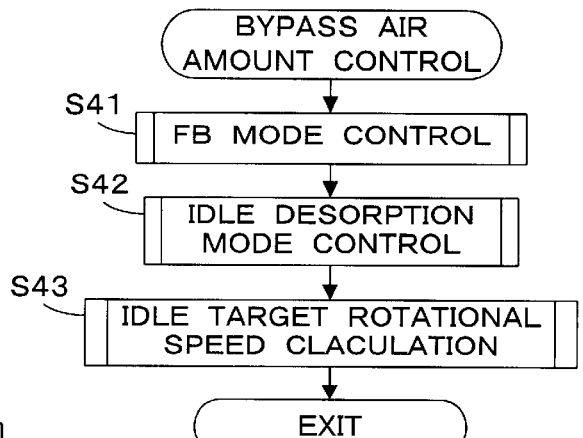

FIG. 3D is an exemplary flowchart of a bypass air amount control process for the idle control valve 20. This process may be executed by the CPU of the ECU 5 in synchronism with the generation of a TDC signal pulse.

Figure 15:
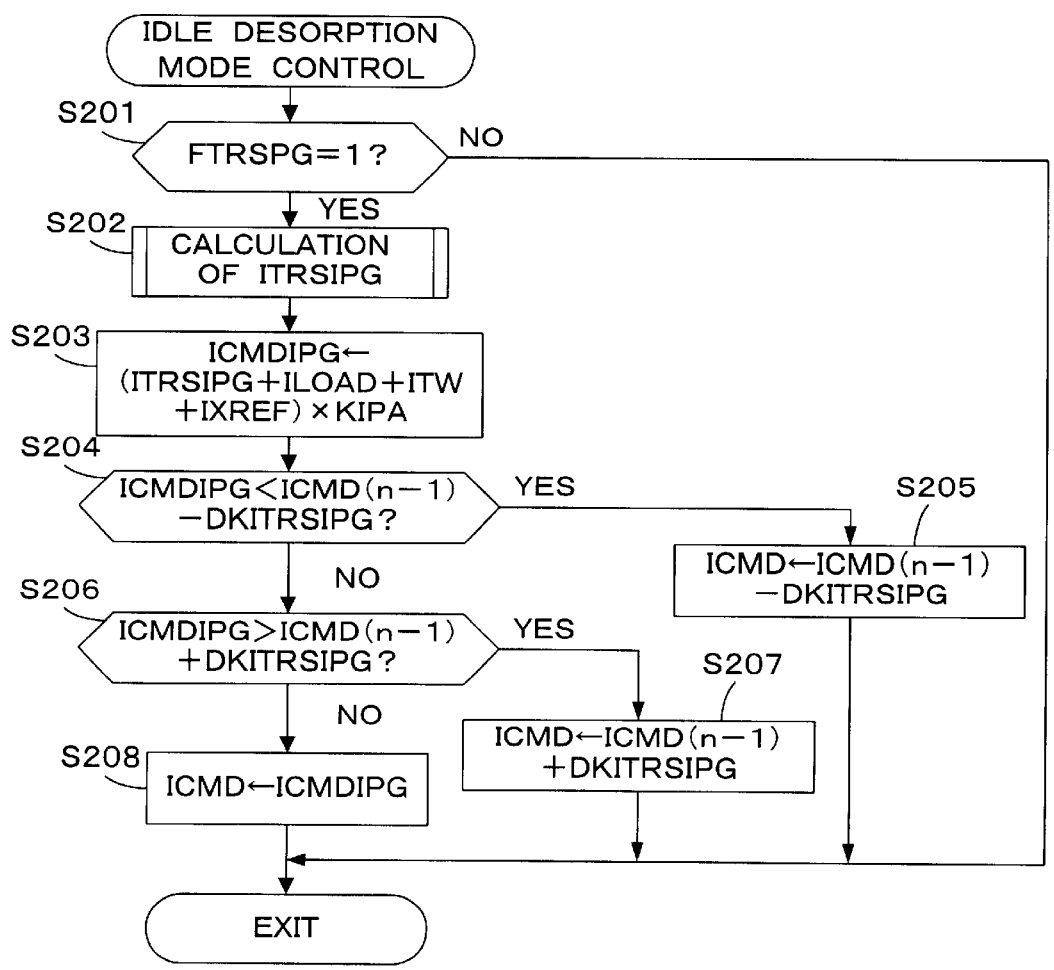
FIG. 15 is a flowchart showing a program for controlling an intake air amount in the idle desorption mode.

In step S41, an FB mode control is executed to carry out feedback control of the bypass air amount so that the engine rotational speed NE coincides with the target engine rotational speed NOBJ during normal idling. In step S42, an idle desorption mode control process shown in FIG. 15 is executed. In this process, the idle desorption mode control term ITRSIPG is calculated. In step S43, an idle target rotational speed calculation process (for example, see FIG. 18) for calculating the target engine rotational speed NOBJ during idling is executed.

Figure 3E:
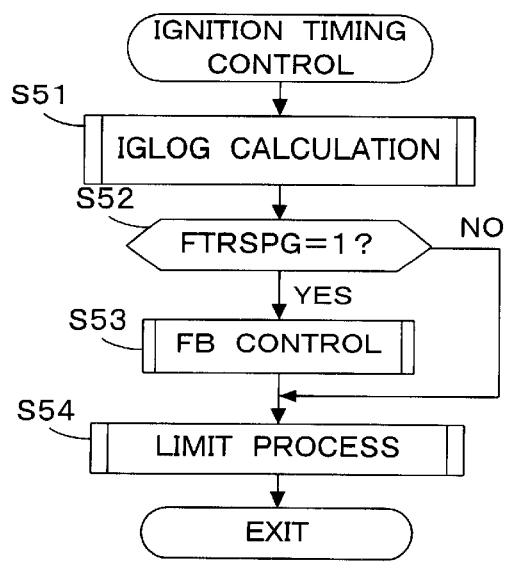

FIG. 3E is an examplary flowchart of an ignition timing control process. This process may be executed by the CPU of the ECU 5 in synchronism with the generation of a TDC signal pulse.

In step S51, the ignition timing IGLOG is calculated by normal control according to engine operating conditions. In step S52, it is determined whether or not the idle desorption flag FTRSPG is "1", indicating that the idle desorption mode is on. If FTRSPG is "0", the process jumps to step S54. If FTRSPG is "1", a feedback control (for example, see FIG. 20) for correcting the ignition timing IGLOG so that the engine rotational speed NE coincides with the target speed NOBJ is executed (step S53). In step S54, a limit process for controlling the ignition timing IGLOG within a predetermined range (between predetermined upper and lower limits) is executed.

FIG. 4 is an exemplary flowchart of the TRS operation condition determination process executed in step S11 shown in FIG. 3A.

In step S61, it is determined whether or not the engine coolant temperature TW is higher than a predetermined lower limit temperature TWTRSL (e.g., −20 degrees Centigrade). If TW is higher than TWTRSL, it is determined whether or not the engine coolant temperature TW is lower than a predetermined upper limit temperature TWTRSH (e.g., 50 degrees Centigrade) (step S62). If the answer to step S61 or S62 is negative (NO), it is determined that a TRS operation condition is not satisfied, and the TRS operation flag FTRSRUN is set to "0" (step S64). If TW is higher than TWTRSL and lower than TWTRSH, it is determined that the TRS operation condition is satisfied, and the TRS operation flag FTRSRUN is set to "1" (step S63).

Figure 5:
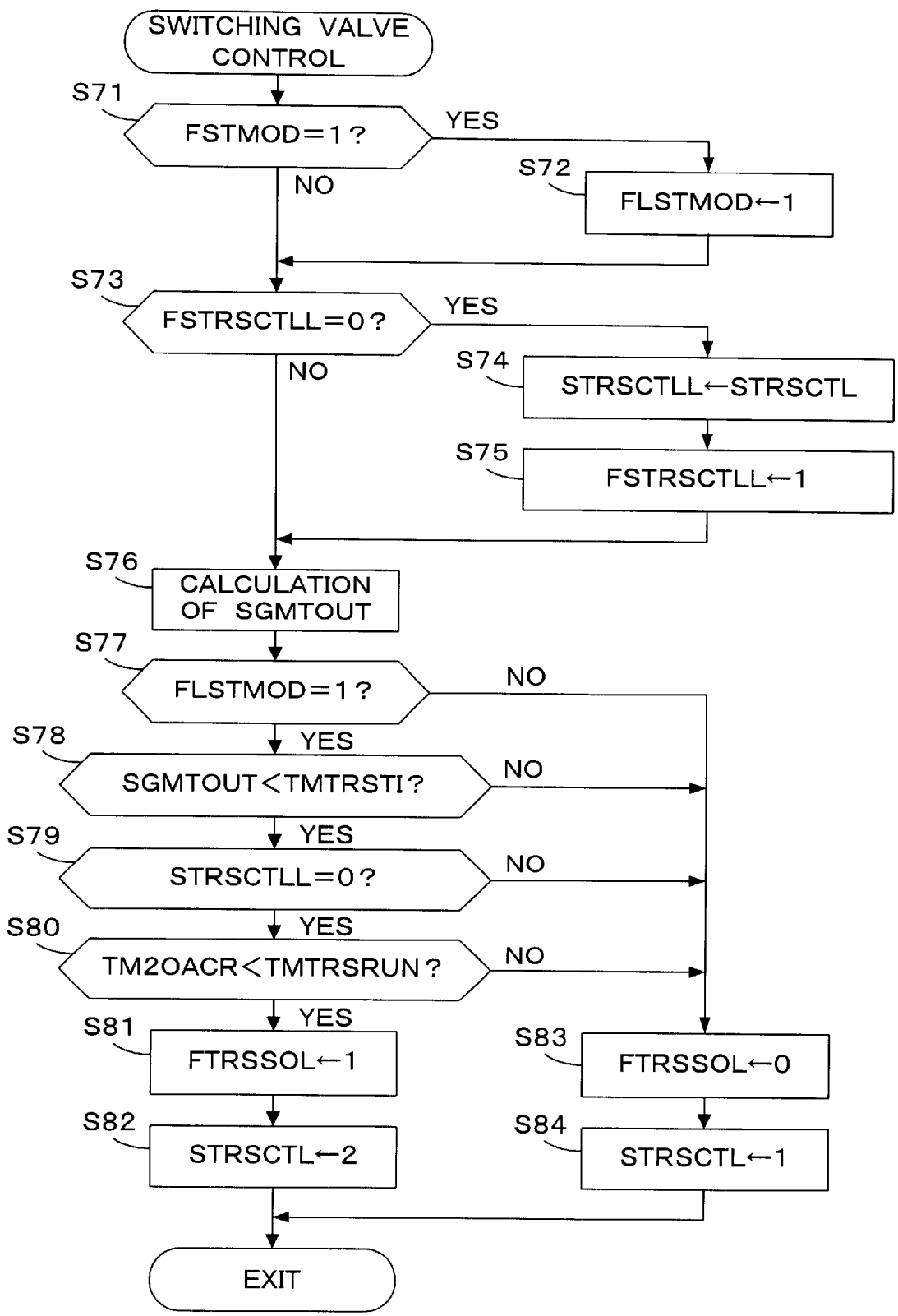
FIG. 5 is a flowchart showing a program for controlling a switching valve provided in an exhaust pipe.

FIG. 5 is an exemplary flowchart of the switching valve control process executed in step S22 shown in FIG. 3B.

In step S71, it is determined whether or not a start mode flag FSTMOD is "1", indicating that the engine 1 is in the start mode. If FSTMOD is "1", a start mode latch flag FLSTMOD is set to "1" (step S72), and the process proceeds to step S73. If FSTMOD is "0", which indicates that the engine 1 is not in the start mode, the process proceeds directly to step S73.

In step S73, it is determined whether or not a status latch flag FSTRSCTLL is "1". Initially, the status latch flag FSTRSCTLL is "0". Accordingly, the process proceeds to step S74, in which the value of a status parameter STRSCTL is stored as an initial parameter value STRSCTLL. Then, the status latch flag FSTRSCTLL is set to "1" (step S75), and the process proceeds to step S76. After execution of step S75, the process proceeds from step S73 directly to step S76.

The status parameter STRSCTL, when set to "0", indicates that the desorption of HC from the HC adsorbent 18 has been completed. The status parameter STRSCTL, when set to "1", indicates that the temperature of the HC adsorbent 18 is rising up to the temperature at which the HC adsorbed in the HC adsorbent 18 can be desorbed, or the desorption of HC from the HC adsorbent 18 is being performed. The status parameter STRSCTL, when set to "2", indicates that the adsorption of HC by the HC adsorbent 18 is being performed. The value of the status parameter STRSCTL is stored in the memory even after turning off the ignition switch. Accordingly, when this process is executed first after turning on the ignition switch, the value of the status parameter STRSCTL at the end of the previous operation is stored as the initial parameter value STRSCTLL.

In step S76, an accumulated value SGMTOUT of fuel injection period TOUT is calculated from Eq. (4) shown below.

$$SGMTOUT = SGMTOUT + KNE \times TOUT \quad (4)$$

In Eq. (4), SGMTOUT on the right side of Eq. (4) is a preceding calculated value. KNE is a correction coefficient proportional to the engine rotational speed NE. TOUT is a fuel injection period calculated from Eq. (1). This process is executed at predetermined time periods, and the number of fuel injections per unit time increases as the engine rotational speed NE increases. In consideration of this point, the fuel injection period TOUT is multiplied by the correction coefficient KNE to calculate the accumulated value SGMTOUT.

It is considered that the total amount of HC flowing into the HC adsorbent 18 after starting the engine is substantially proportional to the accumulated value SGMTOUT. In the following description, SGMTOUT will be referred to as "total fuel amount".

In step S77, it is determined whether or not the start mode latch flag FLSTMOD is "1". If FLSTMOD is "1", it is determined whether or not the total fuel amount SGMTOUT is less than a predetermined reference value TMTRSTI (step S78). If SGMTOUT is less than TMTRSTI, it is determined that the HC adsorbent 18 can further absorb HC (the HC adsorbent 18 is not in the fully-adsorbed condition). Then, it is determined whether or not the initial parameter value STRSCTLL is "0", that is, whether or not the desorption of HC from the HC adsorbent 18 was completed at the end of the preceding operation (step S79). If STRSCTLL is "0", it is determined whether or not an elapsed time period TM20ACT after starting of the engine is shorter than a predetermined time period TMTRSRUN (e.g., 40 sec) (step S80).

If the answers to steps S77 through S80 are all affirmative (YES), a switching flag FTRSSOL is set to "1", and the switching valve 16 is controlled to the start position (shown by the solid line in FIG. 1) (step S81). Further, the status parameter STRSCTL is set to "2" (step S82).

If the answer to any one of steps S77 to S80 is negative (NO), the switching flag FTRSSOL is set to "0", and the switching valve 16 is controlled to the normal position (shown by the broken line in FIG. 1) (step S83). Further, the status parameter STRSCTL is set to "1" (step S84).

According to the process of FIG. 5, the switching valve 16 is controlled to the start position to perform the adsorption of HC by the HC adsorbent 18 when the following conditions are satisfied. The total fuel amount SGMTOUT after starting of the engine has not reached the predetermined reference value TMTRSTI. The desorption of HC adsorbed by the HC adsorbent 18 in the previous operation was completed. The elapsed time after starting of the engine is shorter than the predetermined time TMTRSRUN.

Figure 6:
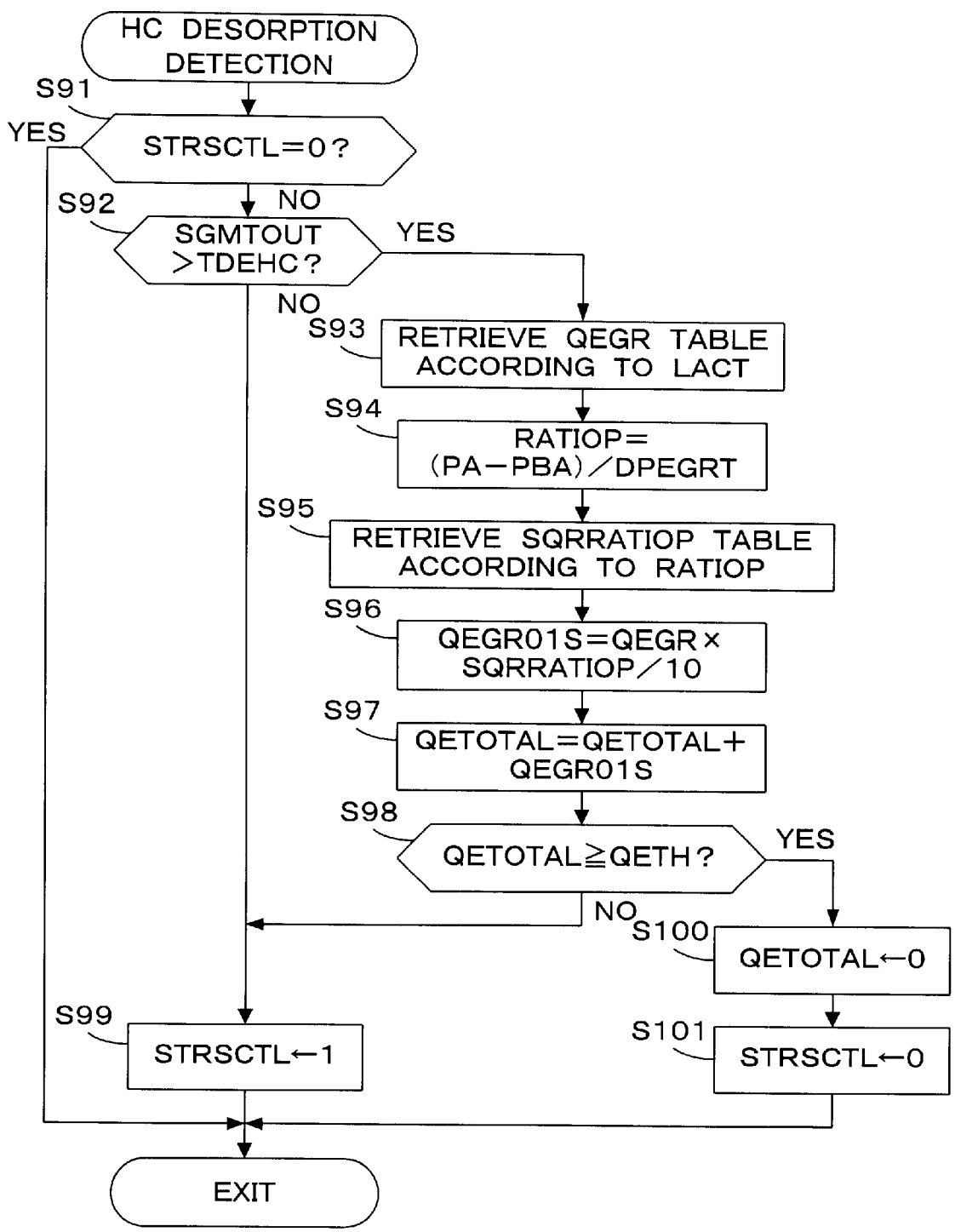
FIG. 6 is a flowchart showing a program for determining the completion of desorption of HC.

FIG. 6 is an exemplary flowchart of the HC desorption detection process executed in step S23 shown in FIG. 3B.

In step S91, it is determined whether or not the status parameter STRSCTL is "0". If STRSCTL is "0", it is indicated that the desorption of HC has been completed, and the process ends. If the status parameter STRSCTL is not "0", it is determined whether or not the total fuel amount SGMTOUT is greater than a predetermined temperature reference value TDEHC (step S92). The predetermined temperature reference value TDEHC is preset as a value corresponding to the accumulated value of fuel amounts injected until the temperature of the HC adsorbent 18 reaches a temperature at which the adsorbed HC can be desorbed at cold starting of the engine. Accordingly, if the total fuel amount SGMTOUT is less than the predetermined temperature reference value TDEHC, the status parameter STRSCTL is set to "1" (step S99), and the process ends.

Figure 7A:
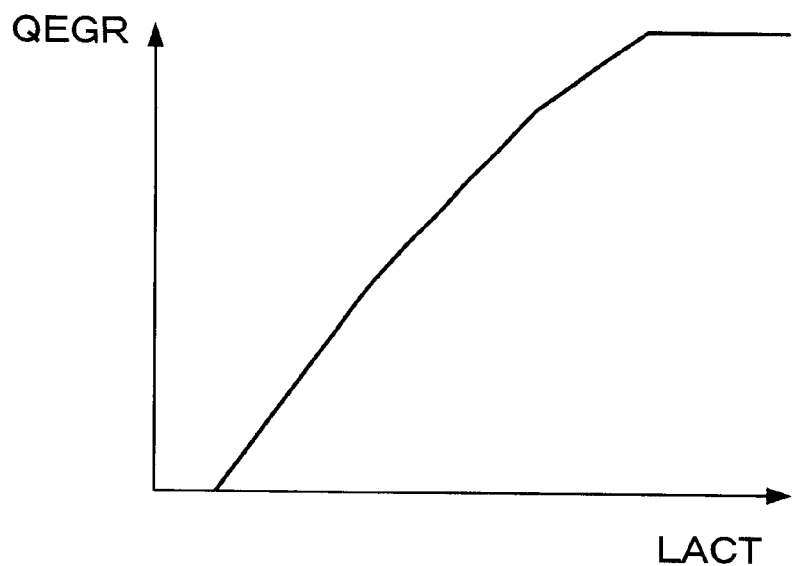
FIGS. 7A and 7B are graphs showing tables used in the processing of FIG. 6.

When the total fuel amount SGMTOUT reaches the predetermined temperature reference value TDEHC, a QEGR table shown in FIG. 7A is retrieved according to the lift amount LACT of the EGR valve 22 to calculate an exhaust gas recirculation amount QEGR (step S93). The QEGR table is set so that the exhaust gas recirculation amount QEGR increases as the lift amount LACT increases.

In step S94, a pressure difference ratio RATIOP is calculated from Eq. (5) shown below.

$$RATIOP = (PA - PBA)/DPEGRT \quad (5)$$

where PA is a detected atmospheric pressure, PBA is a detected absolute intake pressure, and DPEGRT is a constant which is preset according to the QEGR table.

Figure 7B:
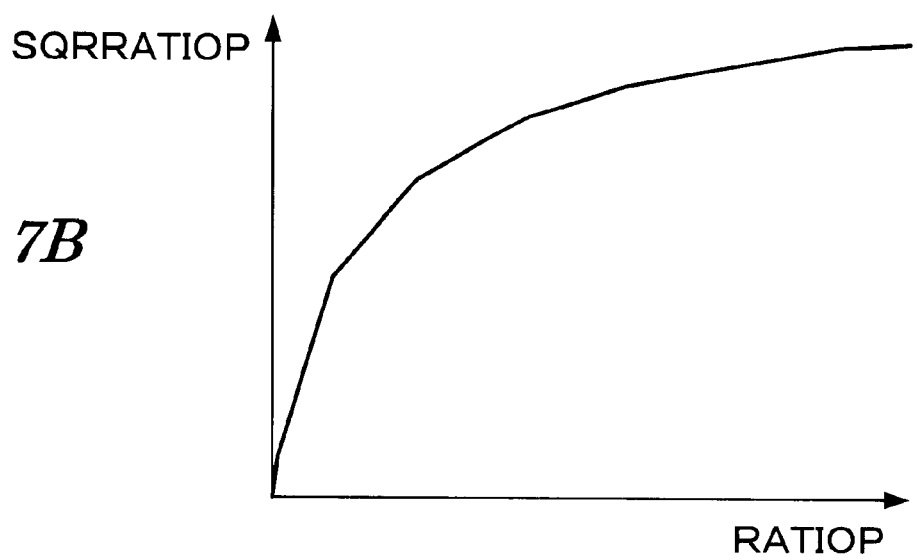

In step S95, an SQRRATIOP table shown in FIG. 7B is retrieved according to the pressure difference ratio RATIOP to calculate a square root SQRRATIOP of the pressure difference ratio RATIOP.

Then, the exhaust gas recirculation amount QEGR calculated in step S93 and the square root SQRRATIOP calculated in step S95 are applied to Eq. (6) shown below to calculate a corrected exhaust gas recirculation amount QEGR01S (step S96).

$$QEGR01S = QEGR \times SQRRATIOP/10 \quad (6)$$

Eq. (6) is derived from the fact that a flow due to a pressure difference between a pressure on the exhaust side of the EGR valve 22 and a pressure on the intake side of the EGR valve 22 is proportional to the square root of the pressure difference (PA−PBA). An accurate exhaust gas recirculation amount can be obtained by Eq. (6).

In step S97, a total exhaust gas recirculation amount QETOTAL is calculated from Eq. (7) shown below.

$$QETOTAL = QETOTAL + QEGR01S \quad (7)$$

Then, it is determined whether or not the total exhaust gas recirculation amount QETOTAL is greater than or equal to a predetermined threshold QETH (step S98). Until the total exhaust gas recirculation amount QETOTAL reaches the predetermined threshold QETH, the process proceeds to step S99. When the total exhaust gas recirculation amount QETOTAL reaches the predetermined threshold QETH, it is determined that the desorption of HC has been completed, and the total exhaust gas recirculation amount QETOTAL is returned to "0" (step S100). Further, the status parameter STRSCTL is set to "0" (step S101).

According to the process of FIG. 6, the corrected exhaust gas recirculation amount QEGR01S is calculated according to the lift amount LACT of the EGR valve 22 and the pressure difference (PA−PBA), and the corrected exhaust gas recirculation amount QEGR01S thus calculated is accumulated to calculate the total exhaust gas recirculation amount QETOTAL. When the total exhaust gas recirculation amount QETOTAL reaches the predetermined threshold QETH, it is determined that the desorption of HC from the HC adsorbent 18 has been completed.

Figure 8:
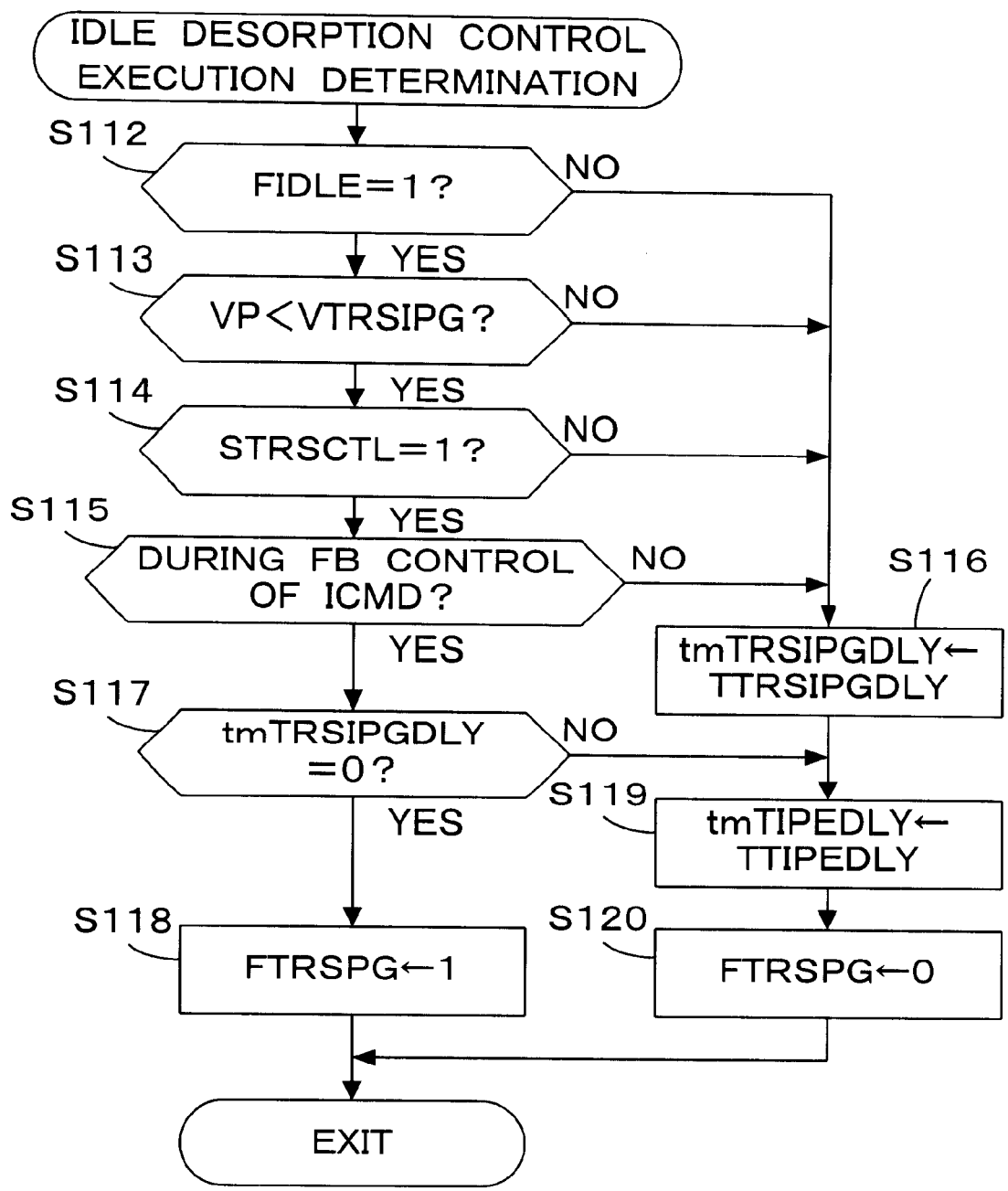
FIG. 8 is a flowchart showing a program for determining the condition for execution of idle desorption control.

FIG. 8 is an exemplary flowchart of the idle desorption control execution determination process executed in step S24 shown in FIG. 3B.

In step S112, it is determined whether or not an idle flag FIDLE is "1", indicating the idling operation of the engine 1. If FIDLE is "1", it is determined whether or not the vehicle speed VP is lower than a predetermined low vehicle speed VTRSIPG (e.g., 4 km/h), that is, whether or not the vehicle is stopped, or almost stopped (step S113). If the vehicle is stopped, or almost stopped, it is determined whether or not the status parameter STRSCTL is "1" (step S114). If STRSCTL is "1", it is determined whether or not the feedback control of the valve opening control amount ICMD for the idle control valve 20 is being performed (step S115). In the normal idling operation, the valve opening control amount ICMD is feedback controlled so that the engine rotational speed NE coincides with the target engine rotational speed NOBJ. Accordingly, it is determined whether or not this feedback control is being performed.

Figure 11:
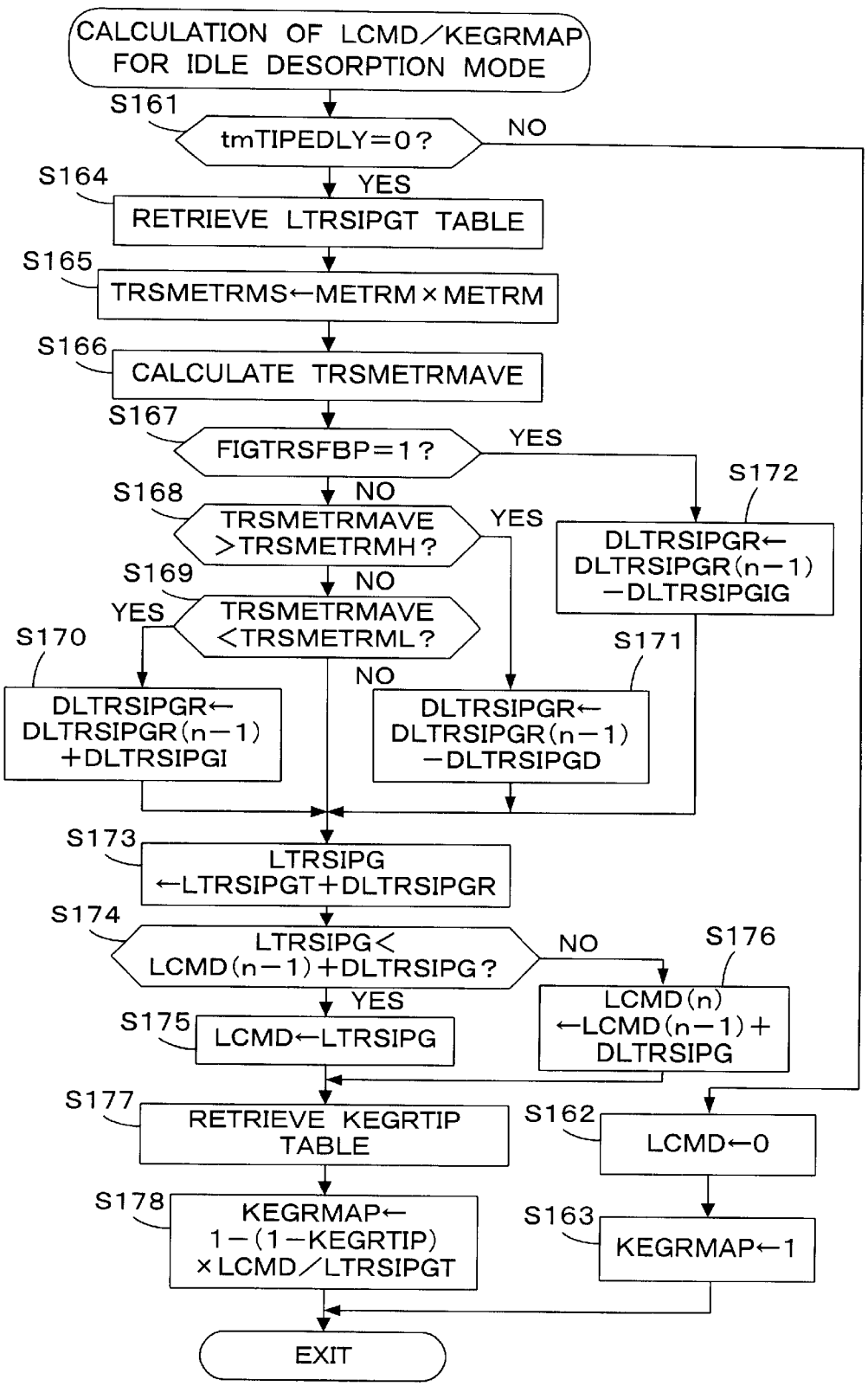
FIG. 11 is a flowchart showing a program for calculating a lift command value (LCMD) and an exhaust gas recirculation correction coefficient (KEGRMAP) for an idle desorption mode.

If the answer to any one of steps S112 to S115 is negative (NO), a downcount timer tmTRSIPGDLY to be referred to in step S117 is set to a predetermined time period TTRSIPGDLY (e.g., 1 sec) and started (step S116). Further, a downcount timer tmTIPEDLY to be referred to in step S161 shown in FIG. 11 is set to a predetermined time TTIPEDLY (e.g., 1.5 sec) and started (step S119). The timer tmTI-PEDLY is a timer for measuring a delay time from the time at which the idle desorption control is started to the time at which the exhaust gas recirculation is started.

In step S120, the idle desorption flag FTRSPG is set to "0", and the process ends.

If the answers to steps S112 to S115 are all affirmative (YES), it is determined whether or not the value of the timer tmTRSIPGDLY started in step S116 is "0" (step S117). Initially, tmTRSIPGDLY is greater than "0", so that the process proceeds to step S119. When the value of the timer tmTRSIPGDLY becomes "0", the idle desorption flag FTRSPG is set to "1" to start the idle desorption control (step S118). Thereafter, the process ends.

According to the process of FIG. 8, the execution of the idle desorption control is permitted when the engine is idling; the vehicle is stopped, or almost stopped; the status parameter STRSCTL is "1", which indicates that the temperature of the HC adsorbent 18 is rising or the desorption of HC from the HC adsorbent 18 is being performed; and the engine rotational speed NE is under feedback control by the idle control valve 20.

FIG. 9 is an exemplary flowchart of the EGR execution condition determination process executed in step S31 shown in FIG. 3C.

In step S131, it is determined whether or not the idle desorption flag FTRSPG is "1". If FTRSPG is "1", the process jumps to step S140, in which an EGR flag FEGR set to "1", indicating that execution of the exhaust gas recirculation is permitted.

If the idle desorption flag FTRSPG is "0", steps S132 to S139 are executed to determine whether or not the engine 1 is in a predetermined operating condition where the exhaust gas recirculation execution condition is satisfied. In step S132, it is determined whether or not the engine 1 is under the air-fuel ratio feedback control according to the output from the LAF sensor 14. If the answer to step S132 is affirmative (YES), it is determined whether or not the engine 1 is in a fuel-cut operation for cutting off the supply of fuel to the engine 1 (step S133). If the answer to step S133 is negative (NO), it is determined whether or not the engine rotational speed NE is higher than a predetermined rotational speed NHEC (e.g., 4500 rpm)(step S134). If the answer to step S134 is negative (NO), it is determined whether or not a wide-open throttle operation flag FWOT is set to "1", indicating that the throttle valve 3 is in a fully opened condition (step S135). If the answer to step S135 is negative (NO), it is determined whether or not the throttle valve opening THA is greater than a predetermined valve opening THIDLE, which indicates that the engine 1 is not operating in the idling condition (step S136). If the answer to step S136 is affirmative (YES), it is determined whether or not the engine coolant temperature TW is higher than a predetermined temperature TWEL (e.g., 40 degrees Centigrade) as at cold starting of the engine 1 (step S137). If the answer to step S137 is affirmative (YES), it is determined whether or not the absolute intake pressure PBA is higher than a predetermined pressure PBAECL, which indicates that the engine 1 is not in a low-load condition (step S138). If the answer to step S138 is affirmative (YES), it is determined whether or not the pressure difference PBGA (=PA−PBA) between the absolute intake pressure PBA and the atmospheric pressure PA is higher than a predetermined pressure DPBAECH, which indicates that the engine 1 is not in a high-load condition (step S139). If the answer to step S139 is affirmative (YES), it is determined that the exhaust gas recirculation execution condition is satisfied, and the EGR flag FEGR is set to "1" (step S140).

On the other hand, if the answer to one of steps S132, and S136 through S139 is negative (NO), or the answer to one of steps S133, S134, and S135 is affirmative (YES), the EGR flag FEGR is set to "0" (step S141) to inhibit the exhaust gas recirculation, so as to prevent a reduction in the operating performance of the engine 1 due to execution of the exhaust gas recirculation.

Figure 10:
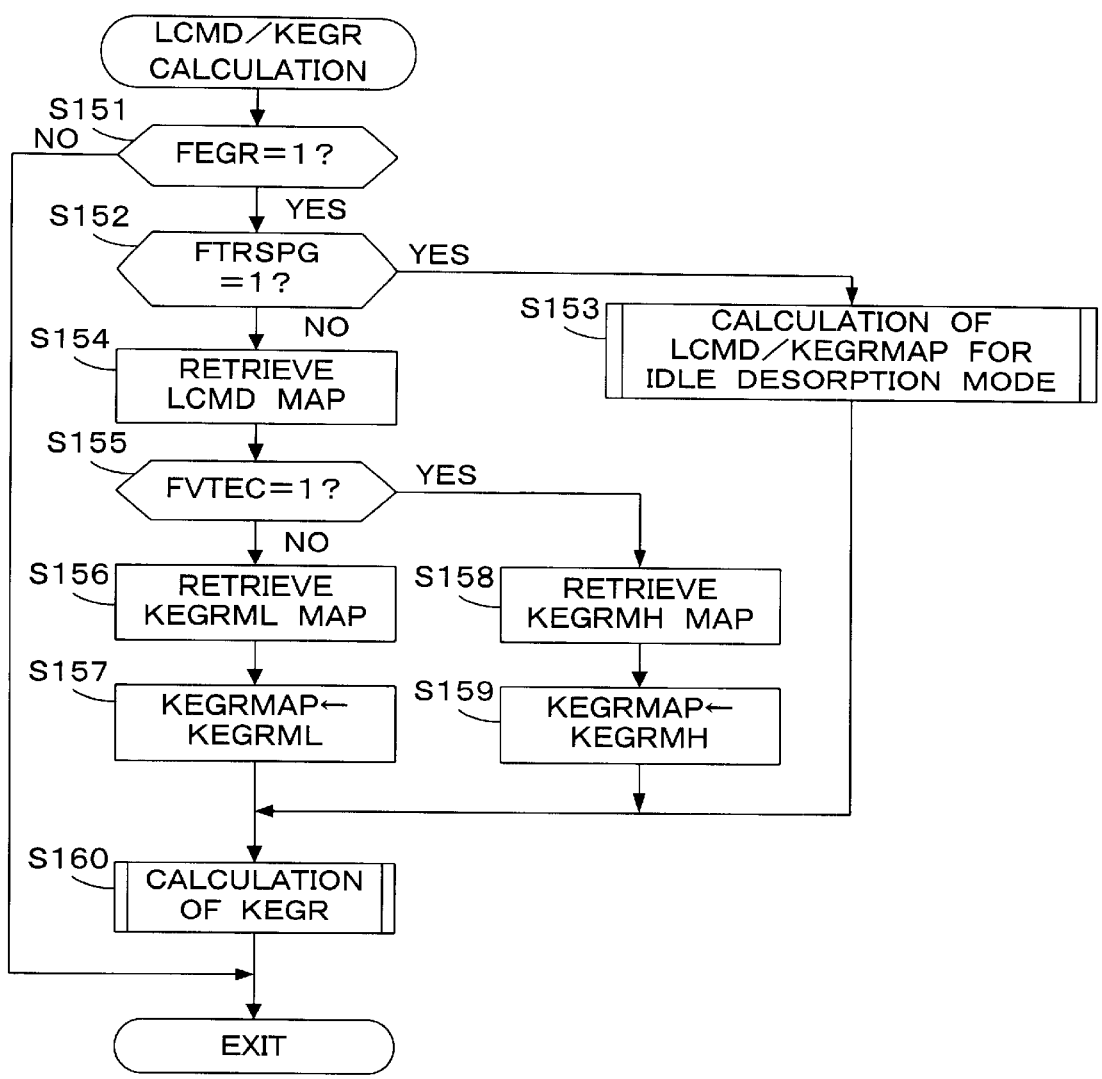
FIG. 10 is a flowchart showing a program for calculating a lift command value (LCMD) for an exhaust gas recirculation valve and an exhaust gas recirculation correction coefficient (KEGR) for a fuel supply amount.

FIG. 10 is an exemplary flowchart of the LCMD/KEGR calculation process executed in step S32 shown in FIG. 3C.

In step S151, it is determined whether or not the EGR flag FEGR is "1". If FEGR is "0", the process ends. If FEGR is "1", it is determined whether or not the idle desorption flag FTRSPG is "1". If FTRSPG is "1", which indicates that the idle desorption mode is on, an LCMD/KEGRMAP calculation process for the idle desorption mode shown in FIG. 11 is executed (step S153), and the process proceeds to step S160.

If FTRSPG is "0" in step S152, which indicates that the normal control is performed, an LCMD map is retrieved according to the engine rotational speed NE and the absolute intake pressure PBA to calculate a lift command value LCMD for the EGR valve 22 (step S154). Then, it is determined whether or not a valve timing flag FVTEC is "1", indicating that the high-speed valve timing is selected (step S155). If FVTEC is "1", a KEGRMH map is retrieved according to the engine rotational speed NE and the absolute intake pressure PBA to calculate an EGR correction coefficient KEGRMH for the high-speed valve timing (step S158), and an EGR correction coefficient map value KEGRMAP is set to the EGR correction coefficient KEGRMH for high-speed valve timing (step S159). Then, the process proceeds to step S160.

If FVTEC is "0" in step S155, a KEGRML map is retrieved according to the engine rotational speed NE and the absolute intake pressure PBA to calculate an EGR correction coefficient KEGRML for low-speed valve timing (step S156), and the map value KEGRMAP is set to the EGR correction coefficient KEGRML for low-speed valve timing (step S157). Then, the process proceeds to step S160.

Figure 13:
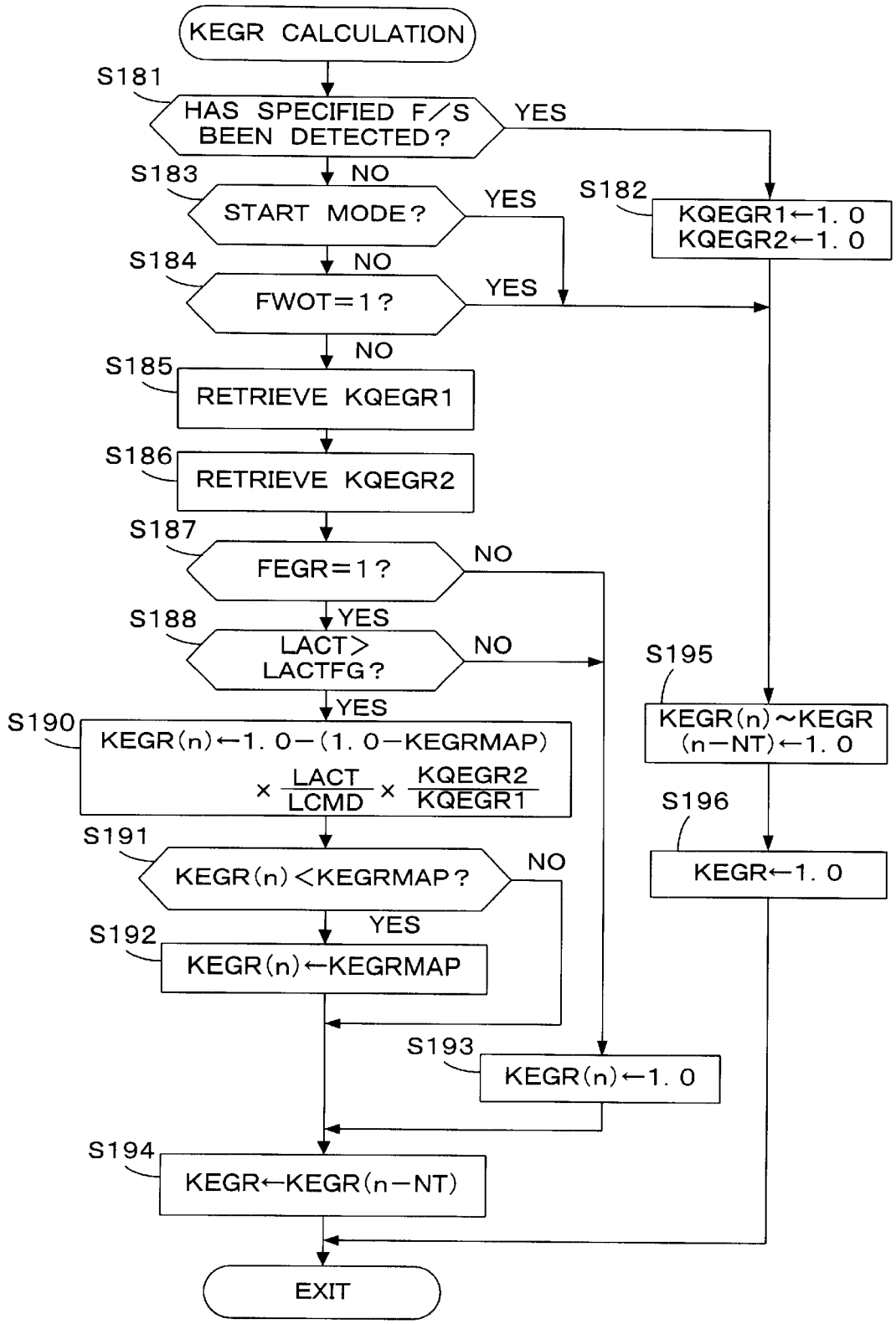
FIG. 13 is a flowchart showing a program for calculating an exhaust gas recirculation correction coefficient (KEGR)

In step S160, KEGR calculation process (an example of which is shown in FIG. 13) is executed, and the process ends.

FIG. 11 is an exemplary flowchart of the LCMD/KEGRMAP calculation process for the idle desorption mode executed in step S153 shown in FIG. 10.

In step S161, it is determined whether or not the value of the timer tmTIPEDLY started in step S119 shown in FIG. 8. Immediately after starting of the idle desorption mode, tmTIPEDLY is greater than "0". Accordingly, the lift command value LCMD is set to "0" (step 162), and the map value KEGRMAP is set to "1.0" (step S163). Thereafter, the process ends.

Figure 12A:
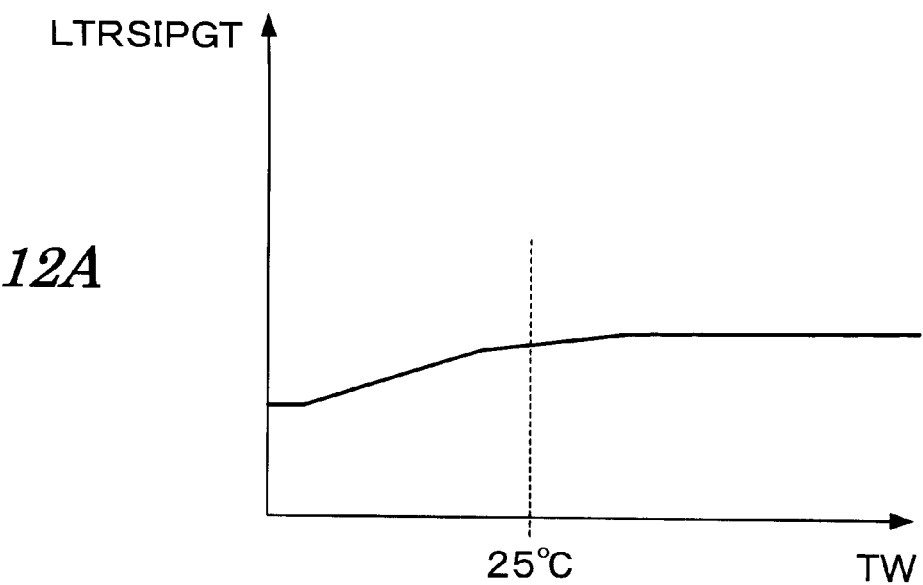
FIGS. 12A and 12B are graphs showing tables used in the processing of FIG. 11.

When the value of the timer tmTIPEDLY becomes "0", the process proceeds to step S164, in which an LTRSIPGT table (an example of which is shown in FIG. 12A) is retrieved according to the engine coolant temperature TW to calculate a basic lift amount LTRSIPGT in the idle desorption mode. The LTRSIPGT table is set so that the basic lift amount LTRSIPGT increases as the engine coolant temperature TW increases.

Next, the square of a rotation fluctuation parameter METRM indicating the amount of rotation fluctuation of the engine 1 is calculated as an effective rotation fluctuation amount TRSMETRMS (step S165).

The rotation fluctuation parameter METRM is defined by Eq. (8) shown below.

$$METRM = [MSME(n) - MSME(n-1)]/KMSSLB \quad (8)$$

where KMSSLB is a coefficient set so that it is inversely proportional to the engine rotational speed NE, and MSME (n) is an average of time periods CRME(n). The time period CRME(n) is a time period between adjacent CRK signal pulses, i.e., a time period required for 30 degree rotation of the crankshaft. The average MSME(n) is defined by Eqs. (9) and (10) shown below. In Eqs. (8)–(10), (n) and (n−1) indicate a present value and a preceding value, respectively.

$$CR12ME(n) = \sum_{i=-11}^{0} CRME(n+i)/12 \quad (9)$$

$$MSME(n) = \sum_{i=-5}^{0} CR12ME(n+i)/6 \quad (10)$$

More specifically, an average of 12 CRME values from a preceding value CRME(n−11) measured 11 cycles before to the latest measured value CRME(n) is calculated from Eq. (9) to obtain a first average CR12ME(n). Further, an average of 6 CR12ME values from a previous value CR12ME(n−5) calculated 5 cycles before to the latest calculated value CR12ME(n) is calculated from Eq. (10) to obtain a second average MSME(n). Thereafter, this second average MSME (n) is applied to Eq. (8) to thereby calculate the rotation fluctuation parameter METRM. The rotation fluctuation parameter METRM has a tendency to increase with a deterioration in the combustion condition of the engine 1, so that this parameter METRM can be used as a parameter indicative of the combustion condition of the engine 1. In general, the combustion becomes more unstable as the exhaust gas recirculation amount increases, and the absolute value of the rotation fluctuation parameter METRM accordingly increases.

In step S166, a moving average TRSMETRMAVE of the effective rotation fluctuation amounts TRSMETRMS is calculated from Eq. (11) shown below.

$$TRSMETRMAVE = \sum_{i=0}^{m} TRSMETRMS(n-i)/(m+1) \quad (11)$$

Where "m" is a predetermined number.

In step S167, it is determined whether or not an excessive advance correction flag FIGTRSFBP is "1", indicating that an advance correction amount of the ignition timing is excessive. The excessive advance correction flag FIGTRSFBP may be set in step S313 shown in FIG. 20.

If FIGTRSFBP is "1", which indicates that the advance correction amount of the ignition timing is excessive, an EGR correction amount DLTRSIPGR is set to a value obtained by subtracting a predetermined amount DLTRSIPGIG from a preceding value DLTRSIPGR(n−1), so as to reduce the exhaust gas recirculation amount (step S172), and the process proceeds to step S173.

If FIGTRSFBP is "0" in step S167, it is determined whether or not the moving average TRSMETRMAVE calculated in step S166 is greater than a first reference value TRSMETRMH (step S168). If TRSMETRMAVE is greater than TRSMETRMH, which indicates that the rotation fluctuation amount of the engine 1 is large, the EGR correction amount DLTRSIPGR is set to a value obtained by subtracting a predetermined amount DLTRSIPGD from the preceding value DLTRSIPGR(n−1), so as to reduce the exhaust gas recirculation amount (step S171), and the process proceeds to step S173.

If TRSMETRMAVE is less than or equal to TRSMETRMH in step S168, it is determined whether or not the moving average TRSMETRMAVE is less than a second reference value TRSMETRML which is less than the first reference value TRSMETRMH (step S169). If TRSMETRMAVE is less than TRSMETRML, which indicates that the rotation fluctuation amount of the engine 1 is small, the EGR correction amount DLTRSIPGR is set to a value obtained by adding a predetermined amount DLTRSIPGI to the preceding value DLTRSIPGR(n−1), so as to increase the exhaust gas recirculation amount (step S170). Thereafter, the process proceeds to step S173.

If TRSMETRMAVE is greater than or equal to TRSMETRML in step S169, the process proceeds directly to step S173.

In step S173, the basic lift amount LTRSIPGT and the EGR correction amount DLTRSIPGR are applied to Eq. (12) shown below to calculate an idle desorption mode lift amount LTRSIPG.

$$LTRSIPG = LTRSIPGT + DLTRSIPGR \quad (12)$$

Next, it is determined whether or not the idle desorption mode lift amount LTRSIPG is less than a value obtained by adding a predetermined change amount DLTRSIPG to the preceding value LCMD(n−1) of the lift command value (step S174). If LTRSIPG is less than (LCMD(n−1)+DLTRSIPG), the idle desorption mode lift amount LTRSIPG is set as the lift command value LCMD (step S175). Thereafter, the process proceeds to step S177. If LTRSIPG is greater than or equal to (LCMD(n−1)+DLTRSIPG), the lift command value LCMD is set to (LCMD(n−1)+DLTRSIPG) (step S176), and the process proceeds to step S177.

Figure 12B:
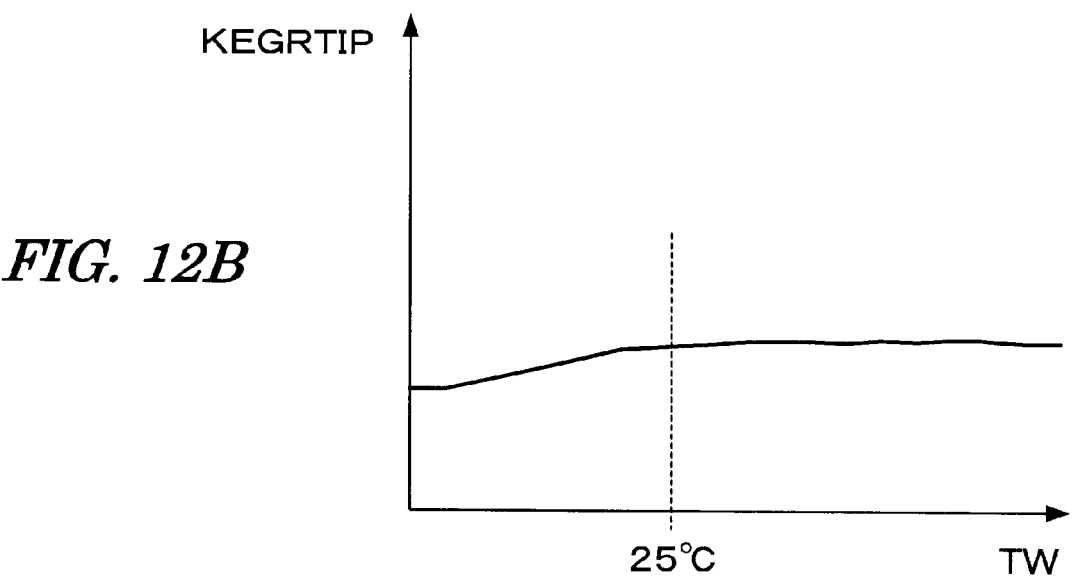

In step S177, a KEGRTIP table shown in FIG. 12B is retrieved according to the engine coolant temperature TW to calculate an EGR correction coefficient KEGRTIP corresponding to the basic lift amount LTRSIPGT. This EGR correction coefficient KEGRTIP will be hereinafter referred to as "basic EGR correction coefficient". The KEGRTIP table is set so that the basic EGR correction coefficient KEGRTIP increases as the engine coolant temperature TW increases.

Next, the basic EGR correction coefficient KEGRTIP, the lift command value LCMD, and the basic lift amount LTRSIPGT are applied to Eq. (13) shown below to calculate a map value KEGRMAP of the EGR correction coefficient (step S178). Although the value KEGRMAP calculated from Eq. (13) is not a map-retrieved value, it is referred to as "map value" for convenience.

$$KEGRMAP = 1 - (1 - KEGRTIP) \times LCMD/LTRSIPGT \quad (13)$$

Figure 20:
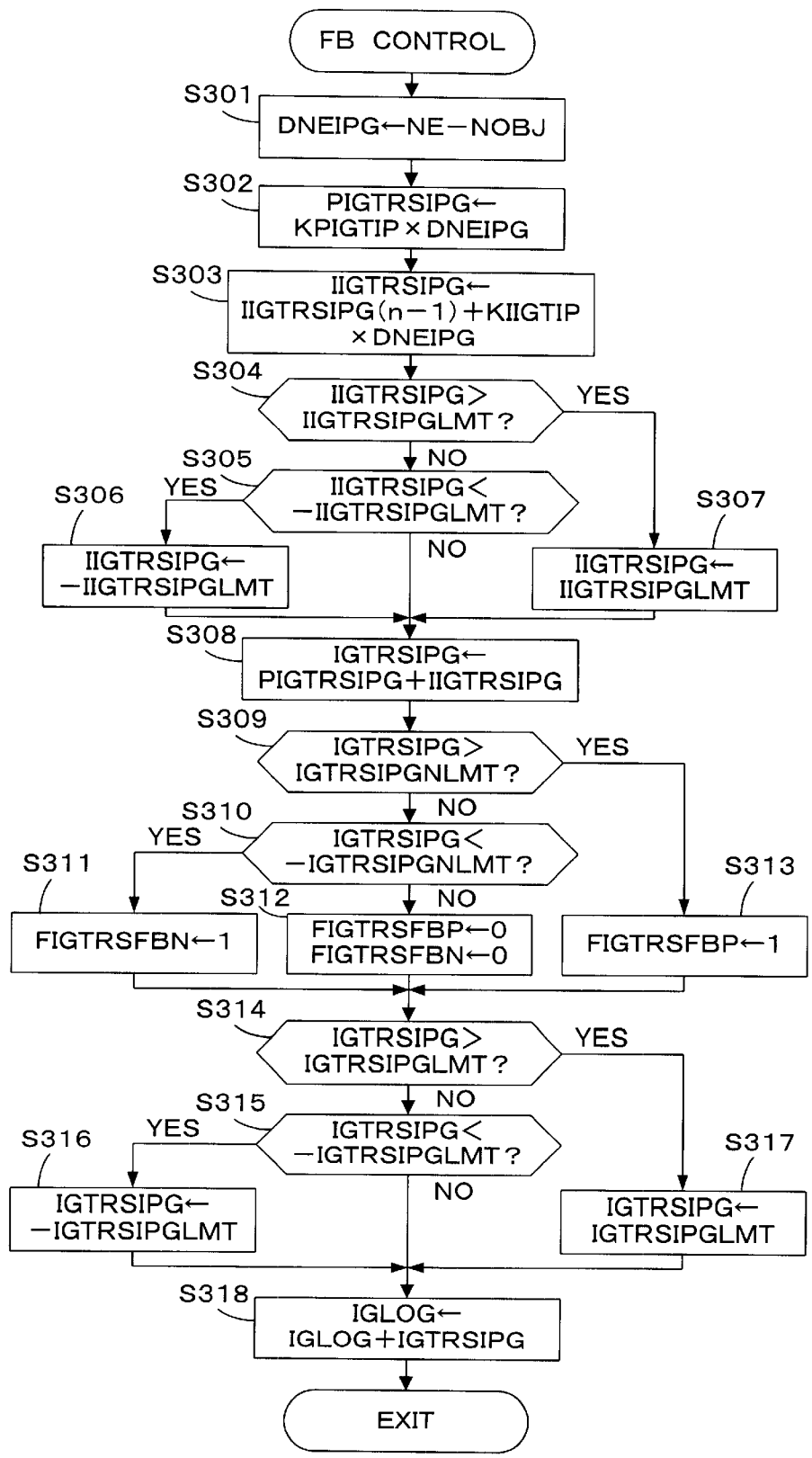
FIG. 20 is a flowchart showing a program for feedback control of an ignition timing.

According to the process of FIG. 11, when the advance correction amount of the ignition timing calculated in the process of FIG. 20 becomes excessive, the exhaust gas recirculation amount is corrected to decrease (steps S167 and S172). When the engine rotation fluctuation amount is large (TRSMETRMAVE is greater than TRSMETRMH), the exhaust gas recirculation amount is corrected to decrease (steps S168 and S171), whereas when the engine rotation fluctuation amount is small (TRSMETRMAVE is less than TRSMETRML), the exhaust gas recirculation amount is corrected to increase (steps S168 to S170). Accordingly, even when the exhaust gas recirculation is performed during idling of the engine, the engine rotation can be maintained in a stable condition.

FIG. 13 is an exemplary flowchart of the KEGR calculation process executed in step S160 shown in FIG. 10. In this process, the EGR correction coefficient KEGR to be actually applied to Eq. (1) is calculated according to the map value KEGRMAP of the EGR correction coefficient.

In step S181, it is determined whether or not a preliminarily specified abnormality has been detected. If the abnormality has been detected, a first coefficient value KQEGR1 and a second coefficient value KQEGR2 to be hereinafter described are both set to "1.0" (step S182). Further, all coefficient values KEGR(n) to KEGR(n−NT) stored in the memory are set to "1.0" (step S195), and the EGR correction coefficient KEGR to be applied to Eq. (1) mentioned above is set to "1.0" (step S196). Thereafter, this process ends.

In this preferred embodiment, a coefficient value calculated according to an engine operating condition at the execution cycle NT times before (a coefficient value calculated at the time NT times generations of the TDC signal pulse before) is used as the EGR correction coefficient KEGR to be applied to Eq. (1), since there is a time lag due to movement of recirculated gases from the EGR valve 22 to the combustion chamber of the engine 1. Accordingly, the present value KEGR(n) calculated every time this process is executed is sequentially stored into the memory. The process of step S195 is for setting all of the (NT+1) coefficient values thus stored to "1.0".

If the answer to step S181 is negative (NO), it is determined whether or not the engine 1 is in the starting mode (step S183). If the engine 1 is not in the starting mode, it is then determined whether or not the wide-open throttle operation flag FWOT is "1" (step S184). If the engine 1 is in the start mode or if the engine 1 is in the wide-open throttle mode, the process proceeds to step S195. If the starting of the engine 1 has been finished and the engine 1 is not operating with a wide-open throttle, the process proceeds to step S185.

Figure 14:
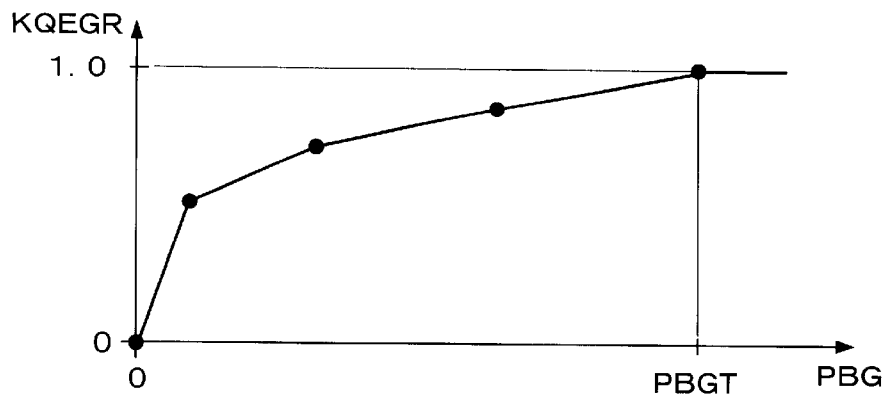
FIG. 14 is a graph showing a table used in the processing of FIG. 13.

In step S185, a KQEGR table (an example of which is shown in FIG. 14) is retrieved according to a pressure difference PBG1 (=PA0−PBA) between a reference atmospheric pressure PA0 (=101.3 kPa (760 mmHg)) and the absolute intake pressure PBA to calculate a first coefficient value KQEGR1. The KQEGR table is set so that the coefficient value KQEGR increases as the pressure difference PBG increases up to a predetermined pressure PBGT. The predetermined pressure PBGT may be set to 28 kPa (210 mmHg), for example.

In step S186, the KQEGR table shown in FIG. 14 is retrieved according to a pressure difference PBG2 between a current atmospheric pressure PA and the absolute intake pressure PBA to calculate a second coefficient value KQEGR2.

Next, it is determined whether or not the EGR flag FEGR is "1" (step S187). If FEGR is "0", which indicates that the exhaust gas recirculation is not carried out, the present value KEGR(n) of the EGR correction coefficient is set to "1.0" (step S193) and the process then proceeds to step S194. On the other hand, if FEGR is "1", which indicates that the exhaust gas recirculation is being carried out, it is determined whether or not the actual valve lift LACT of the EGR valve 22 is greater than a predetermined valve lift LACTFG (step S188). If LACT is less than or equal to LACTFG, which indicates that the actual valve lift LACT is almost zero, the process proceeds to step S193.

If LACT is greater than LACTFG in step S188, the map value KEGRMAP, the actual valve lift LACT, the valve lift command value LCMD, and the first and second coefficient values KQEGR1 and KQEGR2 are applied to Eq. (14) shown below to calculate the present value KEGR(n) of the EGR correction coefficient (step S190).

$$KEGR(n) = 1.0 - (1.0 - KEGRMAP) \times (LACT/LCMD) \times (KQEGR2/KQEGR1) \quad (14)$$

where LACT/LCMD is a correction term for correcting a delay of a change in the actual valve lift LACT from a change in the valve lift command value LCMD in a transient condition where the valve lift of the EGR valve 22 is changing, and KQEGR2/KQEGR1 is a correction term for correcting an influence of a change in the atmospheric pressure PA.

In step S191, it is determined whether or not the present value KEGR(n) calculated in step S190 is less than the map value KEGRMAP. If KEGR(n) is less than KEGRMAP, the present value KEGR(n) is replaced by the map value KEGRMAP (step S192), and the process proceeds to step S194. If KEGR(n) is greater than or equal to KEGRMAP, the process proceeds directly to step S194.

In step S194, the EGR correction coefficient KEGR to be applied to Eq. (1) is set to the NT times-before coefficient value KEGR(n−NT) before NT times. Then, this process ends.

FIG. 15 is an exemplary flowchart of the idle desorption mode control executed in step S42 shown in FIG. 3D.

In step S201, it is determined whether or not the idle desorption flag FTRSPG is "1". If FTRSPG is "0", the process ends.

Figure 16:
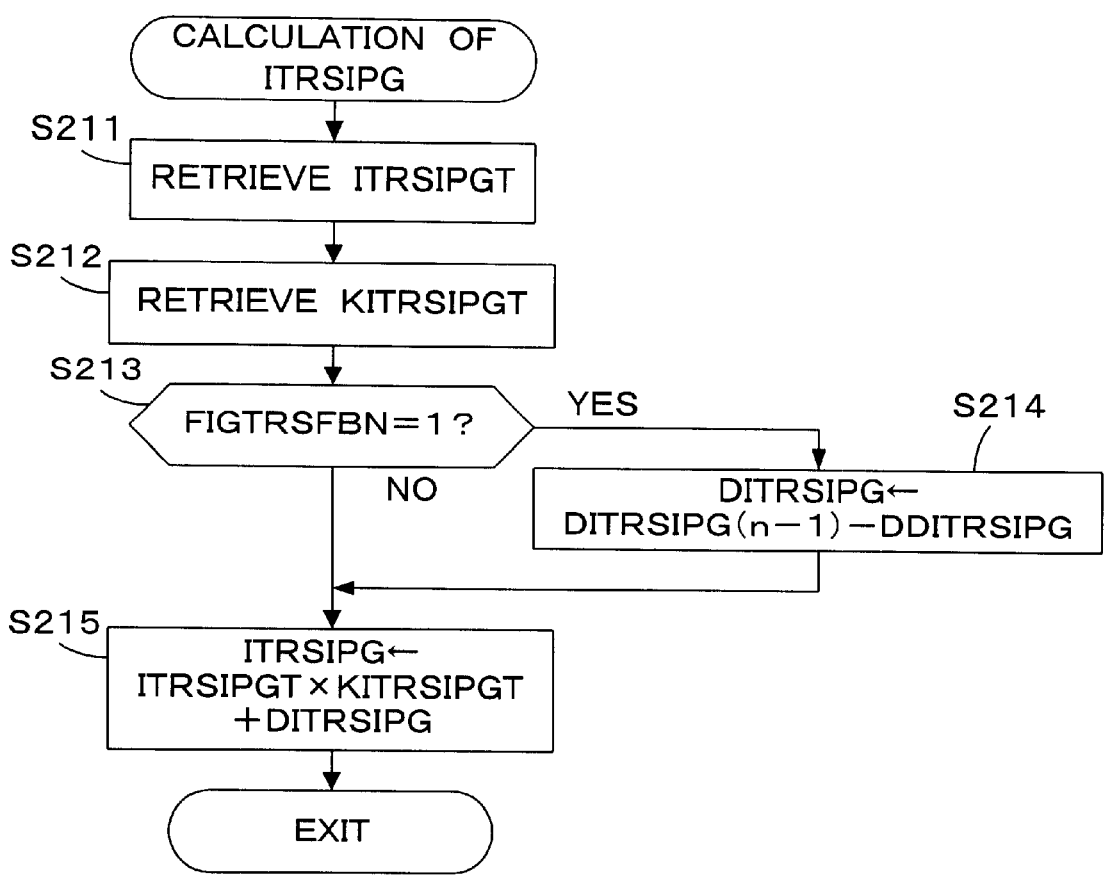
FIG. 16 is a flowchart showing a program for calculating an idle desorption mode control term (ITRSIPG) used for the calculation of a valve opening control amount for an idle control valve.

If FTRSPG is "1", which indicates that the idle desorption mode is on, the ITRSIPG calculation process (an example of which is shown in FIG. 16) is executed (step S202). In this process, the idle desorption mode control term ITRSIPG in Eq. (3) is calculated. In step S203, a valve opening control amount ICMDIPG for the idle desorption mode is calculated from Eq. (15) shown below. Eq. (15) is substantially the same as Eq. (3).

$$ICMDIPG=(ITRSIPG+ILOAD+ITW+IXREF)\times KIPA \quad (15)$$

In step S204, it is determined whether or not the valve opening control amount ICMDIPG for the idle desorption mode is less than a value obtained by subtracting a predetermined change amount DKITRSIPG from the preceding value ICMD(n−1) of the valve opening control amount. If ICMDIPG is less than (ICMD(n−1)−DKITRSIPG), the valve opening control amount ICMD is set to (ICMD(n−1)−DKITRSIPG) (step S205).

If the answer to step S204 is negative (NO), it is determined whether or not the valve opening control amount ICMDIPG for the idle desorption mode is greater than a value obtained by adding the predetermined change amount DKITRSIPG to the preceding value ICMD(n−1) of the valve opening control amount (step S206). If ICMDIPG is greater than (ICMD(n−1)+DKITRSIPG), the valve opening control amount ICMD is set to (ICMD(n−1)+DKITRSIPG) (step S207).

If the answer to step S206 is negative (NO), that is, if the valve opening control amount ICMDIPG for the idle desorption mode calculated in step S203 falls within the range from (ICMD(n−1)−DKITRSIPG) to (ICMD(n−1)+DKITRSIPG), the valve opening control amount ICMDIPG for the idle desorption mode is set as the valve opening control amount ICMD (step S208).

By the execution of steps S204 to S207, a rapid change in the valve opening control amount ICMD can be prevented.

FIG. 16 is an exemplary flowchart of the ITRSIPG calculation processing executed in step S202 shown in FIG. 15.

Figure 17A:
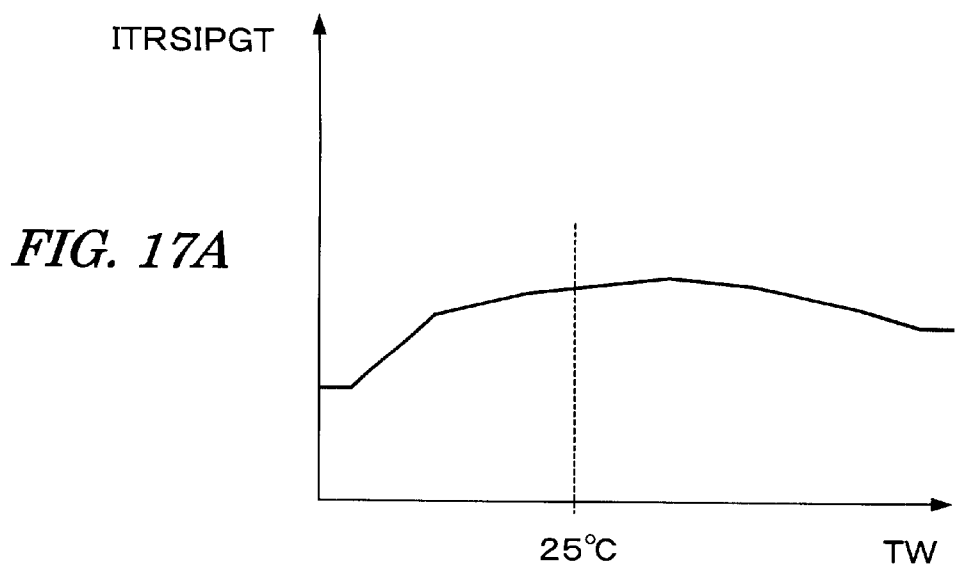
FIGS. 17A and 17B are graphs showing tables used in the processing of FIG. 16.
Figure 17B:
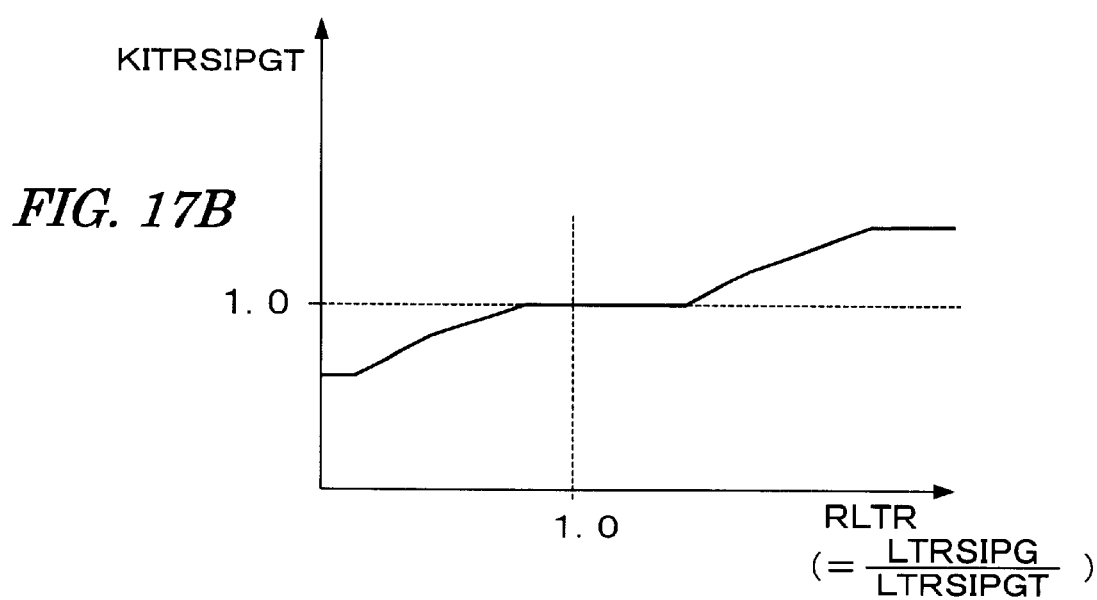

In step S211, an ITRSIPGT table (an example of which is shown in FIG. 17A) is retrieved according to the engine coolant temperature TW to calculate a basic value ITRSIPGT of the idle desorption mode control term. In step S212, a KITRSIPGT table shown in FIG. 17B is retrieved according to a lift amount ratio RLTR to calculate a correction coefficient KITRSIPGT. The KITRSIPGT table is set so that the correction coefficient KITRSIPGT increases as the lift amount ratio RLTR increases.

The lift amount ratio RLTR is a ratio (LTRSIPG/LTRSIPGT) of the idle desorption mode lift amount LTRSIPG to the basic lift amount LTRSIPGT of the EGR valve 22 that may be calculated in the process of FIG. 11.

In step S213, it is determined whether or not an excessive retard correction flag FIGTRSFBN is "1", indicating that the retard correction amount of the ignition timing is excessive. If the answer to step S213 is negative (NO), the process proceeds to step S215. If FIGTRSFBN is "1", a decrease correction term DITRSIPG is calculated from Eq. (16) shown below (step S214).

$$DITRSIPG=DITRSIPG(n-1)-DDITRSIPG \quad (16)$$

where DITRSIPG(n−1) is a preceding value of the decrease correction term, and DDITRSIPG is a predetermined decrease value.

After executing step S214, the process proceeds to step S215.

In step S215, the basic value ITRSIPGT, the correction coefficient KITRSIPGT, and the decrease correction term DITRSIPG are applied to Eq. (17) shown below to calculate the idle desorption mode control term ITRSIPG.

$$ITRSIPG=ITRSIPGT\times KITRSIPGT+DITRSIPG \quad (17)$$

The bypass air amount is corrected by the correction coefficient KITRSIPGT so that the bypass air amount increases as the exhaust gas recirculation amount increases. Further, when the retard correction amount of the ignition timing IGLOG becomes excessive, the bypass air amount is corrected in the decreasing direction by the decrease correction term DITRSIPG.

By using the idle desorption mode control term ITRSIPG set above, the bypass air amount is set to be greater than a decrease of the intake air amount due to the exhaust gas recirculation.

Figure 18:
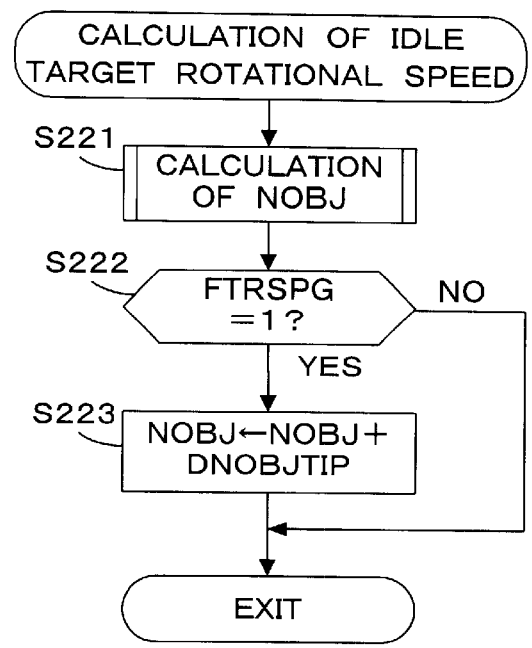
FIG. 18 is a flowchart showing a program for calculating an idle target rotational speed.

FIG. 18 is an exemplary flowchart of the idle target rotational seed calculation process executed in step S43 shown in FIG. 3D.

In step S221, NOBJ calculation process is executed. In the NOBJ calculation process, the target rotational speed NOBJ is set according to whether the vehicle includes an automatic transmission or a manual transmission, according to a shift lever position of the automatic transmission, and so on.

In step S222, it is determined whether or not the idle desorption flag FTRSPG is "1". If FTRSPG is "0", the process ends. If FTRSPG is "1", the target rotational speed NOBJ is increased by a predetermined addition value DNOBJTIP (e.g., 100 rpm) (step S223).

By the process of FIG. 18, the target rotational speed NOBJ in the idle desorption mode is set to a value higher than a normal set value by the predetermined addition value DNOBJTIP.

Figure 19:
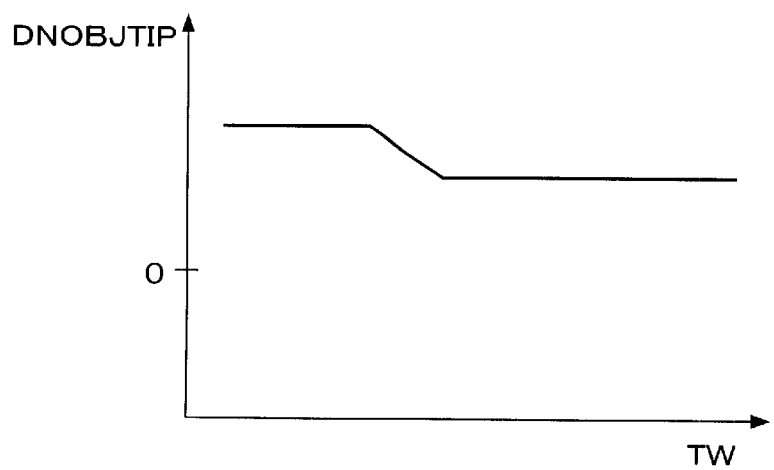
FIG. 19 is a graph showing a table used for the calculation of an addition value (DNOBJTIP) for increasing the target rotational speed.

The addition value DNOBJTIP may be set to increase with a decrease in the engine coolant temperature TW as shown in FIG. 19.

FIG. 20 is an exemplary flowchart of the ignition timing feedback control executed in step S53 shown in FIG. 3E.

In step S301, a deviation DNEIPG (=NE−NOBJ) between the engine rotational speed NE and the target rotational speed NOBJ is calculated. In step S302, the deviation DNEIPG is multiplied by a proportional gain KPIGTIP to calculate a proportional term PIGTRSIPG. Then, an internal term IIGTRSIPG is calculated from Eq. (18) shown below (step S303).

$$IIGTRSIPG=IIGTRSIPG(n-1)+KIIGTIP \times DNEIPG \quad (18)$$

where KIIGTIP is an internal gain.

In steps S304 to S307, a limit process for IIGTRSIPG is executed. More specifically, if IIGTRSIPG is less than or equal to a positive predetermined limit value IIGTR-SIPGLMT and greater than or equal to a negative predetermined limit value –IIGTRSIPGLMT, the process proceeds directly to step S308. If IIGTRSIPG is greater than the positive predetermined limit value IIGTRSIPGLMT, IIGTRSIPG is set to the predetermined limit value IIGTR-SIPGLMT (steps S304 and S307). If IIGTRSIPG is less than the negative predetermined limit value –IIGTRSIPGLMT, IIGTRSIPG is set to the predetermined limit value –IIGTRSIPGLMT (steps S305 and S306).

In step S308, PIGTRSIPG and IIGTRSIPG are added together to calculate the idle desorption mode correction term IGTRSIPG. In step S309, it is determined whether or not the idle desorption mode correction term IGTRSIPG is greater than a predetermined advance limit value IGTRSIPGNLMT. If IGTRSIPG is greater than IGTRSIPGNLMT, it is determined that the advance correction amount of the ignition timing is excessive, and the excessive advance correction flag FIGTRSFBP is accordingly set to "1" (step S313).

If IGTRSIPG is less than or equal to IGTRSIPGNLMT in step S309, it is determined whether or not the idle desorption mode correction term IGTRSIPG is less than a predetermined retard limit value –IGTRSIPGNLMT (step S310). If IGTRSIPG is less than –IGTRSIPGNLMT, it is determined that the retard correction amount of the ignition timing is excessive, and the excessive retard correction flag FIGTRS-FBN is accordingly set to "1" (step S311).

If the answers in steps S309 and S310 are both negative (NO), both the excessive advance correction flag FIGTRS-FBP and the excess retard correction flag FIGTRSFBN are set to "0" (step S312).

In steps S314 to S317, a second limit process for the idle desorption mode correction term IGTRSIPG is executed. More specifically, if the idle desorption mode correction term IGTRSIPG is greater than an upper limit value IGTRSIPGLMT, the idle desorption mode correction term IGTRSIPG is set to the upper limit value IGTRSIPGLMT (steps S314 and S317). If the idle desorption mode correction term IGTRSIPG is less than a lower limit value –IGTRSIPGLMT, the idle desorption mode correction term IGTRSIPG is set to the lower limit value –IGTRSIPGLMT (steps S315 and S316). If the idle desorption mode correction term IGTRSIPG falls between the upper limit value IGTRSIPGLMT and the lower limit value –IGTRSIPGLMT, the process proceeds directly to step S318.

In step S318, the idle desorption mode correction term IGTRSIPG set above is added to the ignition timing IGLOG (=IGMAP+IGCR) calculated in step S51 shown in FIG. 3E, thereby correcting the ignition timing IGLOG.

According to the process of FIG. 20, the ignition timing IGLOG is feedback controlled according to the deviation DNEIPG between the engine rotational speed NE and the target rotational speed NOBJ so that the engine rotational speed NE becomes equal to the target speed NOBJ.

FIGS. 21A to 21E and FIGS. 22A to 22E are time charts for illustrating the control in the idle desorption mode as mentioned above.

At time t10 shown in FIGS. 21A to 21E, the idle desorption flag FTRSPG is set to "1". Thereafter, the valve opening control amount ICMD for the idle control valve 20 is gradually increased. With the increase in this control amount ICMD, the idle desorption mode correction term IGTRSIPG is gradually changed so as to retard the ignition timing, so that the engine rotational speed NE is maintained at the target rotational speed NOBJ. That is, the intake air amount is increased, and the ignition timing is retarded in response to the increase in the intake air amount, thereby avoiding instability of the combustion. Further, the ignition timing is decided by the feedback control so that the engine rotational speed is maintained at the target speed. Accordingly, the ignition timing can be automatically set to an optimum value. When the HC desorbed from the HC adsorbent is recirculated to the intake system, the optimum ignition timing varies according to the amount of the HC mixed into the intake air, which makes it difficult to set the ignition timing to the optimum ignition timing. According to the present embodiment, the ignition timing is decided so that the engine rotational speed is maintained at the target speed by the feedback control, which makes it possible to set the ignition timing to the optimum ignition timing.

At time t11 after the elapse of the predetermined time TTIPEDLY (see step S119 in FIG. 8 and step S161 in FIG. 11) from time t10, the exhaust gas recirculation is started and the lift command value LCMD for the EGR valve 22 is gradually increased.

During the period from time t12 to time t13, the moving average TRSMETRMAVE indicative of a rotation fluctuation amount of the engine exceeds the first reference value TRSMETRMH, and the lift command value LCMD is gradually decreased (see steps S168 and S171 in FIG. 11). Accordingly, an excessive amount of exhaust gas recirculation can be prevented during idling, thereby preventing an increase of the engine rotation fluctuation and a deterioration of the exhaust emission characteristics due to instability of the combustion.

During the period from time t14 to time t15, the moving average TRSMETRMAVE becomes less than the second reference value TRSMETRML and the lift command value LCMD is gradually increased (see steps S169 and S170 in FIG. 11). By increasing the exhaust gas recirculation amount as long as the normal engine operation is maintained, the time period required for completion of the desorption of HC from the HC adsorbent can be shortened.

At time t16, the idle desorption mode correction term IGTRSIPG for the ignition timing exceeds the predetermined advance limit value IGTRSIPGNLMT. Accordingly, the excessive advance correction flag FIGTRSFBP is set to "1" (see steps S309 and S313 in FIG. 20), and the lift command value LCMD for the EGR valve is gradually decreased (see steps S167 and S172 in FIG. 11). When the advance correction amount for the ignition timing becomes excessive, the ignition timing feedback control maintaining the engine rotational speed NE at the target rotational speed NOBJ cannot be stably performed. To cope with this, the exhaust gas recirculation amount is decreased to thereby restore the advance correction amount for the ignition timing to a proper range, thus preventing instability of the feedback control of the ignition timing.

In FIGS. 22A to 22E, the operation from time t10 to time t15 is similar to that shown in FIGS. 21A to 21E. At time t21, the idle desorption mode correction term IGTRSIPG for the ignition timing becomes less than the predetermined retard limit value –IGTRSIPGNLMT. Accordingly, the excessive retard correction flag FIGTRSFBN is set to "1" (see steps S310 and S311 in FIG. 20), and the valve opening control amount ICMD for the idle control valve is gradually decreased (see steps S213 and S214 in FIG. 16). As a result, it is possible to prevent an increase of the engine rotation fluctuation and a deterioration of the combustion (deterioration in the exhaust emission characteristics) due to the excessive retard correction amount of the ignition timing.

The intake air amount (valve opening control amount ICMD), the ignition timing (idle desorption mode correction term IGTRSIPG), and the exhaust gas recirculation amount (lift command value LCMD) are controlled so as to gradually change. Accordingly, a rapid change in the engine operating condition can be avoided to thereby prevent the combustion instability or the engine stall.

In this preferred embodiment, the bypass passage 19, the idle control valve 20, and the ECU 5 constitute an exemplary adsorbent temperature raising means and an exemplary intake air amount increasing means. The EGR valve 22 and the ECU 5 constitute an exemplary recirculation control means. The crank angle position sensor 10 and the ECU 5 constitute an exemplary rotation fluctuation amount detecting means. The ECU 5 constitutes an exemplary ignition timing correcting means. More specifically, steps S42 and S43 in FIG. 3D and steps S52 and S53 in FIG. 3E correspond to an exemplary adsorbent temperature raising means. Steps S42 and S43 in FIG. 3D correspond to an exemplary intake air amount increasing means. The process of FIG. 3C corresponds to an exemplary recirculation control means. Steps S165 and S166 in FIG. 11 correspond to an exemplary rotation fluctuation amount detecting means.

In this preferred embodiment, the bypass passage 19, the idle control valve 20, and the ECU 5 constitute an exemplary adsorbent temperature raising module and an exemplary intake air amount increasing module. The EGR valve 22 and the ECU 5 constitute an exemplary recirculation control module. The crank angle position sensor 10 and the ECU 5 constitute an exemplary rotation fluctuation amount detecting module. The ECU 5 constitutes an exemplary ignition timing correcting module. More specifically, steps S42 and S43 in FIG. 3D and steps S52 and S53 in FIG. 3E correspond to an exemplary adsorbent temperature raising module. Steps S42 and S43 in FIG. 3D correspond to an exemplary intake air amount increasing module. The process of FIG. 3C corresponds to an exemplary recirculation control module. Steps S165 and S166 in FIG. 11 correspond to an exemplary rotation fluctuation amount detecting module.

The present invention is not limited to the above preferred embodiment, but various modifications may be made. For example, the HC desorbed from the HC adsorbent 18 is recirculated to the intake system in the above preferred embodiment. The desorbed HC may also be recirculated to a position upstream of the three-way catalyst 15 in the exhaust system.

The exhaust gas recirculation is started with a dead time (TTIPEDLY in FIG. 21C) with respect to the increase in the intake air amount and the correction of the ignition timing in the idle desorption mode in the above preferred embodiment, the exhaust gas recirculation may be started at the time t10 shown in FIG. 21C. In this case, the rate of increase in the exhaust gas recirculation amount may be made lower, that is, the exhaust gas recirculation amount may be increased very slowly to thereby delay the execution of the exhaust gas recirculation.

Further, the intake air amount is increased by the bypass passage 19 and the idle control valve 20 in the above preferred embodiment. A so-called DBW (Drive By Wire) type throttle valve may be adopted and the throttle valve opening may be directly controlled to thereby increase the intake air amount.

What is claimed is:

1. A control system for an internal combustion engine having an exhaust system provided with an adsorbent for adsorbing hydrocarbon and a catalyst for exhaust gas purification, said control system comprising:

adsorbent temperature raising means for increasing an intake air amount of said engine and retarding an ignition timing of said engine when said adsorbent has adsorbed the hydrocarbon and said engine is operating in an idling condition after activating said catalyst.

2. A control system according to claim 1, wherein said adsorbent temperature raising means gradually increases the intake air amount and gradually retards the ignition timing.

3. A control system according to claim 1, wherein said adsorbent temperature raising means retards the ignition timing so as to maintain a rotational speed of said engine at a target rotational speed.

4. A control system according to claim 1, wherein the hydrocarbon desorbed from said adsorbent is recirculated to a portion upstream of said catalyst.

5. A control system according to claim 1, wherein said adsorbent temperature raising means decreases the intake air amount when the ignition timing is retarded beyond a predetermined retard limit value.

6. A control system for an internal combustion engine having an exhaust system, an intake system, and an exhaust gas recirculation mechanism for recirculating exhaust gases from said exhaust system to said intake system, said exhaust system being provided with an adsorbent for adsorbing hydrocarbon, said control system comprising:

recirculation control means for performing recirculation of the exhaust gases through said exhaust gas recirculation mechanism to recirculate the hydrocarbon desorbed from said adsorbent to said intake system when said adsorbent has adsorbed the hydrocarbon and said engine is operating in an idling condition with retarded ignition timing.

7. A control system according to claim 6, further comprising intake air amount increasing means for increasing an intake air amount of said engine during execution of the exhaust gas recirculation by said recirculation control means.

8. A control system according to claim 7, wherein said intake air amount increasing means controls the intake air amount so that an increase in the intake air amount becomes greater than a decrease in the intake air amount due to the exhaust gas recirculation.

9. A control system according to claim 7, further comprising ignition timing correcting means for correcting an ignition timing of said engine when the intake air amount is increased during execution of the exhaust gas recirculation by said recirculation control means.

10. A control system according to claim 9, wherein the amount of the recirculated exhaust gases, the intake air amount, and the ignition timing are gradually changed.

11. A control system according to claim 10, wherein said ignition timing correcting means corrects the ignition timing so as to maintain a rotational speed of said engine at a target rotational speed.

12. A control system according to claim 10, wherein said recirculation control means increases the amount of the recirculated exhaust gases with a delay or a dead time with respect to the increase of the intake air amount and the correction of the ignition timing.

13. A control system according to claim 12, wherein said ignition timing correcting means corrects the ignition timing after the increase of the intake air amount.

14. A control system according to claim 9, wherein said intake air amount increasing means decreases the intake air amount when the ignition timing is retarded beyond a predetermined retard limit value.

15. A control system according to claim 6, further comprising rotational speed fluctuation amount detecting means for detecting a fluctuation amount of rotational speed of said engine, wherein said recirculation control means increases the amount of the recirculated exhaust gases when the fluctuation amount detected by said rotational speed fluctuation amount detecting means is less than a first predetermined fluctuation amount.

16. A control system according to claim 9, wherein said recirculation control means decreases the amount of the recirculated exhaust gases when the ignition timing is advanced beyond a predetermined advance limit value.

17. A control system for an internal combustion engine having an exhaust system, an intake system, and an exhaust gas recirculation mechanism for recirculating exhaust gases from said exhaust system to said intake system, said exhaust system being provided with an adsorbent for adsorbing hydrocarbon, said control system comprising:

recirculation control means for performing recirculation of the exhaust gases through said exhaust gas recirculation mechanism to recirculate the hydrocarbon desorbed from said adsorbent to said intake system when said adsorbent has adsorbed the hydrocarbon and said engine is operating in an idling condition; and rotational speed fluctuation amount detecting means for detecting a fluctuation amount of rotational speed of said engine, wherein said recirculation control means decreases the amount of the recirculated exhaust gases when the fluctuation amount detected by said rotational speed fluctuation amount detecting means is greater than a second predetermined fluctuation amount.

18. A control method for an internal combustion engine having an exhaust system provided with an adsorbent for adsorbing hydrocarbon and a catalyst for exhaust gas purification, said control method comprising the step of:

increasing an intake air amount of said engine and retarding an ignition timing of said engine when said adsorbent has adsorbed the hydrocarbon and said engine is operating in an idling condition after activating said catalyst.

19. A control method according to claim 18, wherein the intake air amount is gradually increased and the ignition timing is gradually retarded.

20. A control method according to claim 18, wherein the ignition timing is retarded so as to maintain a rotational speed of said engine at a target rotational speed.

21. A control method according to claim 18, wherein the hydrocarbon desorbed from said adsorbent is recirculated to a portion upstream of said catalyst.

22. A control method according to claim 18, wherein the intake air amount is decreased when the ignition timing is retarded beyond a predetermined retard limit value.

23. A control method for an internal combustion engine having an exhaust system, an intake system, and an exhaust gas recirculation mechanism for recirculating exhaust gases from said exhaust system to said intake system, said exhaust system being provided with an adsorbent for adsorbing hydrocarbon, said control method comprising the step of:

performing recirculation of the exhaust gases through said exhaust gas recirculation mechanism to recirculate the hydrocarbon desorbed from said adsorbent to said intake system when said adsorbent has adsorbed the hydrocarbon and said engine is operating in an idling condition with a retarded ignition timing.

24. A control method according to claim 23, further comprising the step of increasing an intake air amount of said engine during execution of the exhaust gas recirculation.

25. A control method according to claim 24, wherein the intake air amount is controlled so that an increase in the intake air amount becomes greater than a decrease in the intake air amount due to the exhaust gas recirculation.

26. A control method according to claim 24, further comprising the step of correcting an ignition timing of said engine when the intake air amount is increased during execution of the exhaust gas recirculation.

27. A control method according to claim 26, wherein the amount of the recirculated exhaust gases, the intake air amount, and the ignition timing are gradually changed.

28. A control method according to claim 27, wherein the ignition timing is corrected so as to maintain a rotational speed of said engine at a target rotational speed.

29. A control method according to claim 27, wherein the amount of the recirculated exhaust gases is increased with a delay or a dead time with respect to the increase of the intake air amount and the correction of the ignition timing.

30. A control method according to claim 29, wherein the ignition timing is corrected after the increase of the intake air amount.

31. A control method according to claim 26, wherein the intake air amount is decreased when the ignition timing is retarded beyond a predetermined retard limit value.

32. A control method according to claim 23, further comprising the step of detecting a fluctuation amount of rotational speed of said engine, wherein the amount of the recirculated exhaust gases is increased when the detected fluctuation amount is less than a first predetermined fluctuation amount.

33. A control method according to claim 23, further comprising the step of detecting a fluctuation amount of rotational speed of said engine, wherein said recirculation control means decreases the amount of the recirculated exhaust gases when the detected fluctuation amount is greater than a second predetermined fluctuation amount.

34. A control method according to claim 26, wherein the amount of the recirculated exhaust gases is decreased when the ignition timing is advanced beyond a predetermined advance limit value.

35. A control system for an internal combustion engine having an exhaust system provided with an adsorbent for adsorbing hydrocarbon and a catalyst for exhaust gas purification, said control system comprising:

an adsorbent temperature raising module for increasing an intake air amount of said engine and retarding an ignition timing of said engine when said adsorbent has adsorbed the hydrocarbon and said engine is operating in an idling condition after activating said catalyst.

36. A control system according to claim 35, wherein said adsorbent temperature raising module gradually increases the intake air amount and gradually retards the ignition timing.

37. A control system according to claim 35, wherein said adsorbent temperature raising module retards the ignition timing so as to maintain a rotational speed of said engine at a target rotational speed.

38. A control system according to claim 35, wherein the hydrocarbon desorbed from said adsorbent is recirculated to a portion upstream of said catalyst.

39. A control system according to claim 35, wherein said adsorbent temperature raising module decreases the intake air amount when the ignition timing is retarded beyond a predetermined retard limit value.

40. A control system for an internal combustion engine having an exhaust system, an intake system, and an exhaust gas recirculation mechanism for recirculating exhaust gases from said exhaust system to said intake system, said exhaust system being provided with an adsorbent for adsorbing hydrocarbon, said control system comprising:

a recirculation control module for performing recirculation of the exhaust gases through said exhaust gas recirculation mechanism to recirculate the hydrocarbon desorbed from said adsorbent to said intake system when said adsorbent has adsorbed the hydrocarbon and said engine is operating in an idling condition with a retarded ignition timing.

41. A control system according to claim 40, further comprising an intake air amount increasing module for increasing an intake air amount of said engine during execution of the exhaust gas recirculation by said recirculation control module.

42. A control system according to claim 41, wherein said intake air amount increasing module controls the intake air amount so that an increase in the intake air amount becomes greater than a decrease in the intake air amount due to the exhaust gas recirculation.

43. A control system according to claim 41, further comprising an ignition timing correcting module for correcting an ignition timing of said engine when the intake air amount is increased during execution of the exhaust gas recirculation by said recirculation control module.

44. A control system according to claim 43, wherein the amount of the recirculated exhaust gases, the intake air amount, and the ignition timing are gradually changed.

45. A control system according to claim 44, wherein said ignition timing correcting module corrects the ignition timing so as to maintain a rotational speed of said engine at a target rotational speed.

46. A control system according to claim 44, wherein said recirculation control module increases the amount of the recirculated exhaust gases with a delay or a dead time with respect to the increase of the intake air amount and the correction of the ignition timing.

47. A control system according to claim 46, wherein said ignition timing correcting module corrects the ignition timing after the increase of the intake air amount.

48. A control system according to claim 43, wherein said intake air amount increasing module decreases the intake air amount when the ignition timing is retarded beyond a predetermined retard limit value.

49. A control system according to claim 40, further comprising a rotational speed fluctuation amount detecting module for detecting a fluctuation amount of rotational speed of said engine, wherein said recirculation control module increases the amount of the recirculated exhaust gases when the fluctuation amount detected by said rotational speed fluctuation amount detecting module is less than a first predetermined fluctuation amount.

50. A control system according to claim 40, further comprising a rotational speed fluctuation amount detecting module for detecting a fluctuation amount of rotational speed of said engine, wherein said recirculation control module decreases the amount of the recirculated exhaust gases when the fluctuation amount detected by said rotational speed fluctuation amount detecting module is greater than a second predetermined fluctuation amount.

51. A control system according to claim 43, wherein said recirculation control module decreases the amount of the recirculated exhaust gases when the ignition timing is advanced beyond a predetermined advance limit value.

* * * * *